US010557339B2

(12) United States Patent
Tatom

(10) Patent No.: US 10,557,339 B2
(45) Date of Patent: Feb. 11, 2020

(54) KIT, SYSTEM, AND METHOD OF USE FOR LIFTING VEHICLES

(71) Applicant: Shane Tatom, Fortville, IN (US)

(72) Inventor: Shane Tatom, Fortville, IN (US)

(\*) Notice: Subject to any disclaimer, the term of this patent is extended or adjusted under 35 U.S.C. 154(b) by 299 days.

(21) Appl. No.: 15/783,501

(22) Filed: Oct. 13, 2017

(65) Prior Publication Data

US 2018/0105405 A1     Apr. 19, 2018

Related U.S. Application Data

(60) Provisional application No. 62/407,684, filed on Oct. 13, 2016.

(51) Int. Cl.
*B66F 7/28* (2006.01)
*E21B 44/00* (2006.01)
*G06Q 10/10* (2012.01)
*E21B 49/00* (2006.01)
*E21B 49/08* (2006.01)

(52) U.S. Cl.
CPC .......... *E21B 44/00* (2013.01); *E21B 49/008* (2013.01); *E21B 49/08* (2013.01); *G06Q 10/1097* (2013.01); *Y02P 90/20* (2015.11)

(58) Field of Classification Search
CPC ........ E21B 44/00; E21B 49/008; E21B 49/08; G06Q 10/1097; Y02P 90/20; B66F 7/00; B66F 7/28; B66F 7/24; B66F 7/20
See application file for complete search history.

(56) References Cited

U.S. PATENT DOCUMENTS

| 1,903,905 | A | * | 4/1933 | Carter | B66F 7/0625 |
| | | | | | 187/211 |
| 3,877,548 | A | * | 4/1975 | Hernick | B66F 7/00 |
| | | | | | 187/204 |
| 4,084,790 | A | * | 4/1978 | Molnar | B66F 7/02 |
| | | | | | 187/215 |
| 4,086,982 | A | * | 5/1978 | Hernick | B66F 7/00 |
| | | | | | 187/206 |
| 4,491,194 | A | * | 1/1985 | Mountz | B66F 7/28 |
| | | | | | 187/204 |
| 4,804,068 | A | * | 2/1989 | Carter | B66F 7/0641 |
| | | | | | 187/210 |
| 4,984,657 | A | * | 1/1991 | Burns | B66F 7/025 |
| | | | | | 187/207 |

(Continued)

*Primary Examiner* — Michael A Riegelman
(74) *Attorney, Agent, or Firm* — Roberts IP Law; John Roberts

(57) ABSTRACT

A light-weight kit for lifting vehicles, configured to be removably added to and used with a two-post vehicle lift by one person with no tools or with just conventional hand tools. A kit may include a pair of support beams each extending longitudinally from a front end to a back end and each comprising at least two arm connection structures each configured to removably engage and be supported by the vehicle support pad structures on the ends of the arms of the vehicle lift. A pair of baskets may be configured to support a vehicle each have an upwardly-concave cross-section extending between first and second transversely spaced hanging structures configured to be removably and selectably attached with and supported by the support beams at longitudinally-spaced mounting positions on the support beam.

20 Claims, 21 Drawing Sheets

(56) References Cited

U.S. PATENT DOCUMENTS

| | | | | | |
|---|---|---|---|---|---|
| 5,099,956 | A | * | 3/1992 | Curran | B25H 1/0007 |
| | | | | | 187/203 |
| 5,727,656 | A | * | 3/1998 | Gaudioso | B66F 7/02 |
| | | | | | 187/221 |
| 5,954,160 | A | * | 9/1999 | Wells, Sr. | B66F 7/28 |
| | | | | | 187/203 |
| 6,814,342 | B1 | * | 11/2004 | Perlstein | B66F 7/02 |
| | | | | | 254/1 |
| 6,845,848 | B1 | * | 1/2005 | Kritzer | B66F 7/28 |
| | | | | | 187/213 |
| 9,527,707 | B1 | * | 12/2016 | Fehringer | B66F 7/26 |
| 9,902,599 | B1 | * | 2/2018 | Veresko | B66F 3/46 |
| 2007/0283854 | A1 | * | 12/2007 | Taylor | B66F 7/28 |
| | | | | | 108/42 |
| 2009/0183952 | A1 | * | 7/2009 | Alford | B66F 7/28 |
| | | | | | 187/203 |
| 2009/0309331 | A1 | * | 12/2009 | Ryan | B60B 33/0002 |
| | | | | | 280/462 |
| 2018/0105405 | A1 | * | 4/2018 | Tatom | G06Q 10/1097 |

* cited by examiner

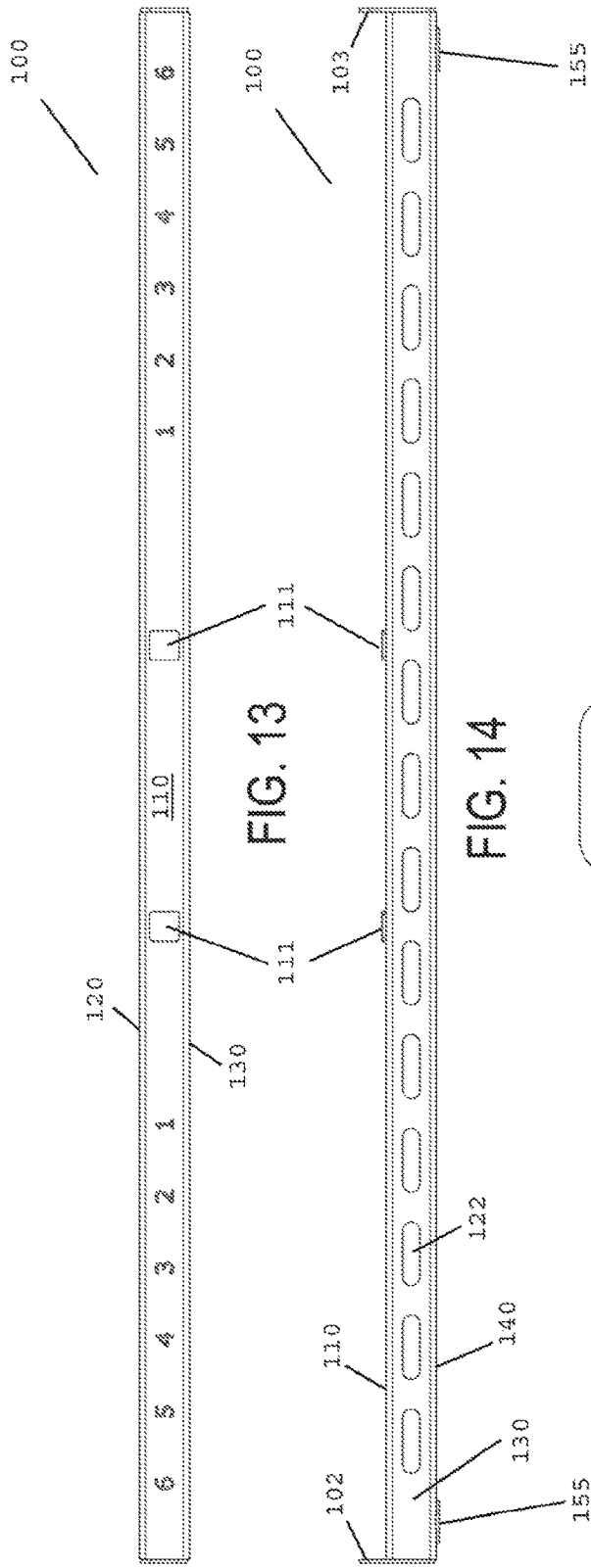
FIG. 13
FIG. 14
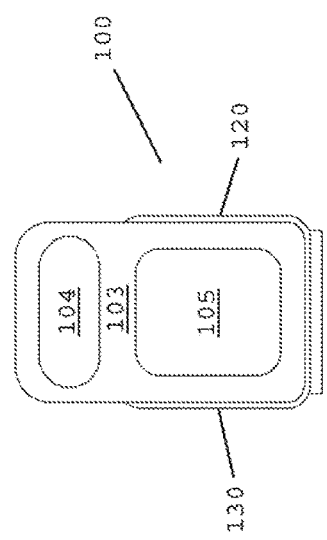
FIG. 15
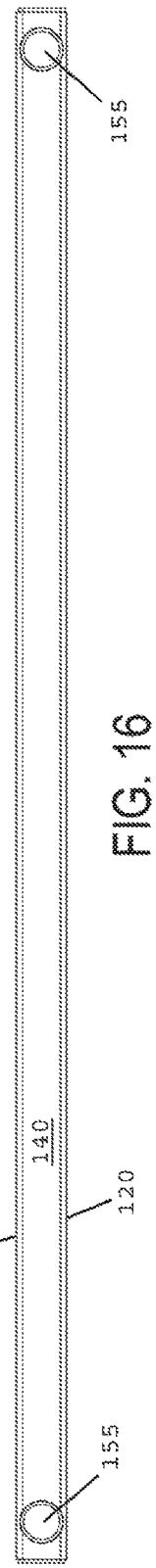
FIG. 16

KIT, SYSTEM, AND METHOD OF USE FOR LIFTING VEHICLES

CROSS-REFERENCE TO RELATED APPLICATIONS

The present application claims priority to and is a non-provisional of U.S. Pat. App. No. 62/407,684, filed Oct. 13, 2016, which is incorporated herein by reference.

FEDERALLY SPONSORED RESEARCH OR DEVELOPMENT

None.

TECHNICAL FIELD

The present disclosure relates generally to vehicle lift apparatus, and kits, systems, and methods of using same.

BACKGROUND

Vehicle lift apparatus are known. Incorporated herein by reference is U.S. Pat. No. 4,084,790 issued to Molnar on Apr. 18, 1978 ("Molnar"). FIG. 1 of Molnar shows a typical two-post vehicle lift used for lifting automobiles and the like. These two-post vehicle lifts typically use pads positioned at the ends of four pivoting and extendable arms to support and lift the body or perimeter frame of a vehicle. Some vehicles, however, such as tractors, lawn mowers, tracked vehicles, all-terrain vehicles (ATVs), and gardening vehicles, for example, may not have a typical body or perimeter frame that can be readily supported and lifted with such arms and pads.

Molnar discusses with respect to FIG. 2 a complex laterally-movable track structure for use with two-post vehicle lifts to accommodate non-standard vehicles having a certain range of lengths and widths. But the bulky structure of Molnar FIG. 2 would be heavy to install on and remove from the lift, vehicle tire width would be limited by the width of the tracks, and the tracks would significantly block access from underneath when the vehicle is lifted on the lift. Additionally, the track system of Molnar would not accommodate vehicles where the front and rear wheels are substantially different in overall outer or inner width.

Another structure to adapt two-post vehicle lifts for use with non-standard vehicles is described in U.S. Pat. No. 5,727,656 issued to Gaudioso et al. on Mar. 17, 1998 ("Gaudioso"), which is hereby incorporated herein by reference. Like Molnar, Gaudioso also provides two movable tracks, but the tracks in Gaudioso move independently of each other both laterally (side to side), longitudinally (fore and aft) and pivotally. Gaudioso thus suffers from the same drawbacks as Molnar, with the additional drawback that the tracks in Gaudioso must be aligned in parallel with each other and with the longitudinal axis of the vehicle, and aligned in the same longitudinal (fore and aft) position, when the vehicle is being loaded onto the tracks. Since tracks tend to move as the vehicle is driven onto them, the Gaudioso system would be difficult to use.

There are other drawbacks and limitations to the designs and use of these and other vehicle lift apparatus as will be apparent to persons of skill in the art. There remains a need for an improved kit, system, and method of use for removably adapting a typical two-post or similar vehicle lift to work well and easily with a variety of non-standard vehicles having various wheelbase lengths and track widths, such as smaller tracked vehicles and wheeled vehicles such as tractors, lawn mowers, all-terrain vehicles (ATVs), and gardening vehicles, for example, which may have differently-sized, wide, turf-style tires.

SUMMARY

The present invention(s) elegantly overcome many of the drawbacks of prior systems and provide numerous additional improvements and benefits as will be apparent to persons of skill in the art. Provided in various example embodiments is a kit for lifting vehicles that can be removably installed on a standard two-post vehicle lift in less than two minutes, by hand by one person with the use of either no tools or just conventional hand tools. Such kits may be configured to be removably added to and used with a two-post vehicle lift that comprises a pair of vertical transversely spaced columns each including a vertically movable lifting carriage pivotally attached with a pair of horizontally extendable and retractable lifting arms each having a vehicle support pad structure proximate a terminal end thereof, the kit comprising: a pair of support beams each extending longitudinally from a front end to a back end and each comprising at least two arm connection structures each configured to removably engage and be supported by one of the vehicle support pad structures; and a pair of baskets configured to support a vehicle, each basket having an upwardly-concave cross-section extending between first and second transversely spaced hanging structures each configured to be removably and selectably attached with and supported by one of the support beams at any of a plurality of longitudinally-spaced mounting positions on the support beam.

In various example embodiments the arm connection structures on each support beam comprise an adapter extending from a first end configured to removably engage a hole in a vehicle support pad structure to a second end configured to removably engage a hole in the support beam. In various example embodiments the upwardly-concave cross-section of each basket further comprises inclined ramps extending from each side thereof, the inclined ramps configured to facilitate a tire of a vehicle driving into, over, and out of each basket. In various example embodiments each support beam has a cross-section having at least a left side, a top side, and a right side, and each hanging structure on each basket is configured to removably engage the left side, top side, and right side of a support beam. In various example embodiments both support beams have top sides comprising correspondingly-spaced markings indicating various positions on which the hanging structures may be removably and selectably attached. In various example embodiments each hanging structure is configured to be removably and selectably attached with a support beam by a threaded member, the threaded member connected with the hanging structure and oriented to pinch the support beam against the hanging structure when the threaded member is hand-tightened, and to release the hanging structure from the support beam when the threaded member is hand-loosened. In various example embodiments the upwardly-concave cross-sections have a cross-sectional profile defining a concavity having a depth and width configured to cradle a tire on a vehicle, further comprising one or more spacer plates sized and shaped to fit in the upwardly-concave cross-section and reduce the depth of the concavity.

Also provided in various example embodiments is a system for lifting vehicles, comprising: a two-post vehicle lift that comprises a pair of vertical transversely spaced columns each including a vertically movable lifting carriage pivotally attached with a pair of horizontally extendable and retractable lifting arms each having a vehicle support pad structure proximate a terminal end thereof; a pair of transversely spaced support beams each extending longitudinally from a front end to a back end and each comprising at least two arm connection structures each removably engaged with and supported by one of the vehicle support pad structures; and a pair of longitudinally spaced baskets configured to support a vehicle, each basket having an upwardly-concave cross-section extending between first and second transversely spaced hanging structures each removably and selectably attached with and supported by one of the support beams at one of a plurality of longitudinally-spaced mounting positions on the support beam.

In various example embodiments each of the arm connection structures on each support beam is removably engaged with and supported by a respective one of the vehicle support pad structures via an adapter extending from a first end removably engaged in a hole in the vehicle support pad structure to a second end removably engaged in a hole in the support beam. In various example embodiments the upwardly-concave cross-section of each basket further comprises inclined ramps extending from each side thereof, the inclined ramps configured to facilitate a tire of a vehicle driving into, over, and out of each basket. In various example embodiments each support beam has a cross-section having at least a left side, a top side, and a right side, and each hanging structure on each basket is removably engaged with the left side, top side, and right side of a support beam. In various example embodiments both support beams have top sides comprising correspondingly-spaced markings indicating various positions on which the hanging structures may be removably and selectably attached. In various example embodiments each hanging structure is removably and selectably attached with a support beam by a threaded member, the threaded member connected with the hanging structure and oriented to pinch the support beam against the hanging structure when the threaded member is hand-tightened, and to release the hanging structure from the support beam when the threaded member is hand-loosened. In various example embodiments the upwardly-concave cross-sections have a cross-sectional profile defining a concavity having a depth and width configured to cradle a tire on a vehicle, further comprising one or more spacer plates positioned in the basket and sized and shaped to fit in the upwardly-concave cross-section and reduce the depth of the concavity.

Further provided in various example embodiments is a method of utilizing a vehicle lift, comprising the steps of: providing a two-post vehicle lift that comprises a pair of vertical transversely spaced columns each including a vertically movable lifting carriage pivotally attached with a pair of horizontally extendable and retractable lifting arms each having a vehicle support pad structure proximate a terminal end thereof; providing a kit as described herein; and assembling the kit on the two-post vehicle lift by: removably positioning the pair of support beams on the vehicle pad structures so that the support beams are transversely spaced, comprising the steps of: removably engaging a first one of the arm connection structures of a first support beam with a vehicle support pad structure on a first lifting arm of a first lifting carriage; removably engaging a second one of the arm connection structures of the first support beam with a vehicle support pad structure on a second lifting arm of the first lifting carriage; removably engaging a first one of the arm connection structures of a second support beam with a vehicle support pad structure on a first lifting arm of a second lifting carriage; and removably engaging a second one of the arm connection structures of the second support beam with a vehicle support pad structure on a second lifting arm of the second lifting carriage; removably positioning the pair of baskets on the pair of support beams so that the baskets are parallel and longitudinally spaced at first and second selected longitudinally-spaced mounting positions on the support beams, comprising the steps of: removably engaging the first hanging structure of a first basket with the first support beam at the first selected longitudinally-spaced mounting position on the first support beam; removably engaging the second hanging structure of the first basket with the second support beam at the first selected longitudinally-spaced mounting position on the second support beam; removably engaging the first hanging structure of the second basket with the first support beam at the second selected longitudinally-spaced mounting position on the first support beam; and removably engaging the second hanging structure of the second basket with the second support beam at the second selected longitudinally-spaced mounting position on the second support beam.

In various example embodiments the method may further comprise the steps of causing a vehicle to be positioned on the pair of baskets; and lifting the vehicle by causing the two-post vehicle lift to raise the vertically movable lifting carriages. In various example embodiments the method may further comprise the steps of lowering the vehicle by causing the two-post vehicle lift to lower the vertically movable lifting carriages; and causing the vehicle to be positioned off of the pair of baskets. In various example embodiments the method may further comprise the steps of disassembling the kit and removing the kit from the two-post vehicle lift, by: removing the pair of baskets from the pair of support beams, comprising the steps of: removing the first hanging structure of the first basket from the first support beam; removing the second hanging structure of the first basket from the second support beam; removing the first hanging structure of the second basket from the first support beam; and removing the second hanging structure of the second basket from the second support beam; removing the pair of support beams from the vehicle pad structures, comprising the steps of: removing the first one of the arm connection structures of the first support beam from the vehicle support pad structure on the first lifting arm of the first lifting carriage; removing the second one of the arm connection structures of the first support beam from the vehicle support pad structure on the second lifting arm of the first lifting carriage; removing the first one of the arm connection structures of the second support beam from the vehicle support pad structure on the first lifting arm of the second lifting carriage; and removing the second one of the arm connection structures of the second support beam from the vehicle support pad structure on the second lifting arm of the second lifting carriage.

In various example embodiments where each of the arm connection structures on a support beam comprises an adapter extending from a first end configured to removably engage a hole in a vehicle support pad structure to a second end configured to removably engage a hole in the support beam, the method may further comprise the steps of: removably engaging a first one of the arm connection structures of a first support beam with a vehicle support pad structure on a first lifting arm of a first lifting carriage by connecting there-between a first adapter; removably engaging a second one of the arm connection structures of the first support beam with a vehicle support pad structure on a second lifting arm of the first lifting carriage by connecting there-between a second adapter; removably engaging a first one of the arm connection structures of a second support beam with a vehicle support pad structure on a first lifting arm of a second lifting carriage by connecting there-between a third adapter; and removably engaging a second one of the arm connection structures of the second support beam with a vehicle support pad structure on a second lifting arm of the second lifting carriage by connecting there-between a fourth adapter.

In various example embodiments the method may further comprise the steps of re-positioning the second basket by: disengaging the first hanging structure of the second basket from the first support beam at the second selected longitudinally-spaced mounting position on the first support beam and disengaging the second hanging structure of the second basket from the second support beam at the second selected longitudinally-spaced mounting position on the second support beam; removably engaging the first hanging structure of the second basket with the first support beam at a third selected longitudinally-spaced mounting position on the first support beam; and removably engaging the second hanging structure of the second basket with the second support beam at a third selected longitudinally-spaced mounting position on the second support beam.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define, or otherwise establish the scope of legal protection.

BRIEF DESCRIPTION OF THE DRAWINGS

Various example embodiments are depicted in the accompanying drawings for illustrative purposes, and should in no way be interpreted as limiting the scope of the embodiments. Furthermore, various features of different disclosed embodiments can be combined to form additional embodiments, which are also part of this disclosure. It will be understood that certain components and details may not appear in the Figure(s) to assist in more clearly describing the invention.

FIG. 3A is a detail view of an end portion of an extendable arm of an example two-post lift, showing an example vehicle support pad structure comprising a hole.

FIG. 13 is a top plan view of the example support beam portion of FIG. 11.

FIG. 14 is a side elevation view of the example support beam portion of FIG. 11.

FIG. 15 is an end view of the example support beam portion of FIG. 11.

FIG. 16 is a bottom plan view of the example support beam portion of FIG. 11.

DETAILED DESCRIPTION OF EXAMPLE EMBODIMENTS

Reference is made herein to some specific examples embodying the present invention, including any best modes contemplated by the inventor for carrying out the invention. Examples of these specific embodiments are illustrated in the accompanying Figure(s). While examples of the invention are described in conjunction with these specific embodiments, it will be understood that this description is not intended to limit the invention to the described or illustrated embodiments. To the contrary, this description is intended to cover alternatives, modifications, and equivalents as may be included within the spirit and scope of the invention as defined by the appended claims.

In the following description, numerous specific details are set forth in order to provide a thorough understanding of the example embodiments. Particular example embodiments may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 3:
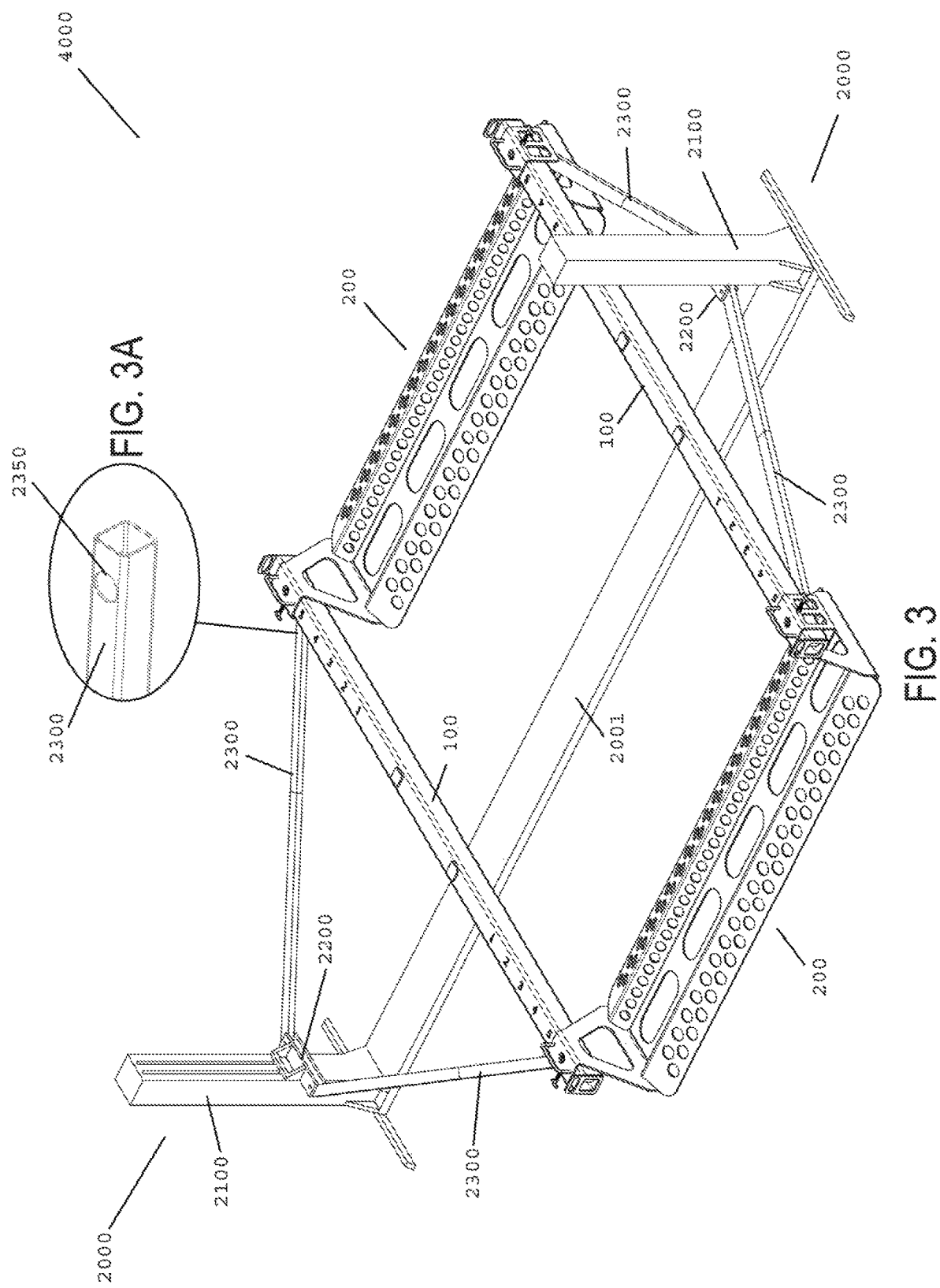
FIG. 3 is a perspective illustration of a system for lifting vehicles, showing the example kit of FIG. 1 installed on an example two-post vehicle lift.

Turning to FIGS. 1-24, shown is a perspective illustration of an example embodiment of certain elements of a kit 1000 for lifting vehicles 3000. A kit 1000 for lifting vehicles 3000 may be configured to be removably added to and used with a two-post vehicle lift 2000 that comprises a pair of vertical transversely spaced columns 2100 each including a vertically movable lifting carriage 2200 pivotally attached with a pair of horizontally extendable and retractable lifting arms 2300 each having a vehicle support pad structure 2350 proximate a terminal end thereof as shown in FIG. 3A. Two-post lifts 2000 sometimes include a connecting cross-member 2001 (FIG. 3) between the vertical transversely spaced columns 2100, but other lifts 2000 might not include such a cross-member 2001. The present invention may be configured to work with two-post lifts 2000 regardless whether they have a cross-member 2001, as evident from the geometry shown in the Figures. The kit 1000 installed on a two-post lift 2000 comprises a vehicle lift system 4000.

Figure 12:
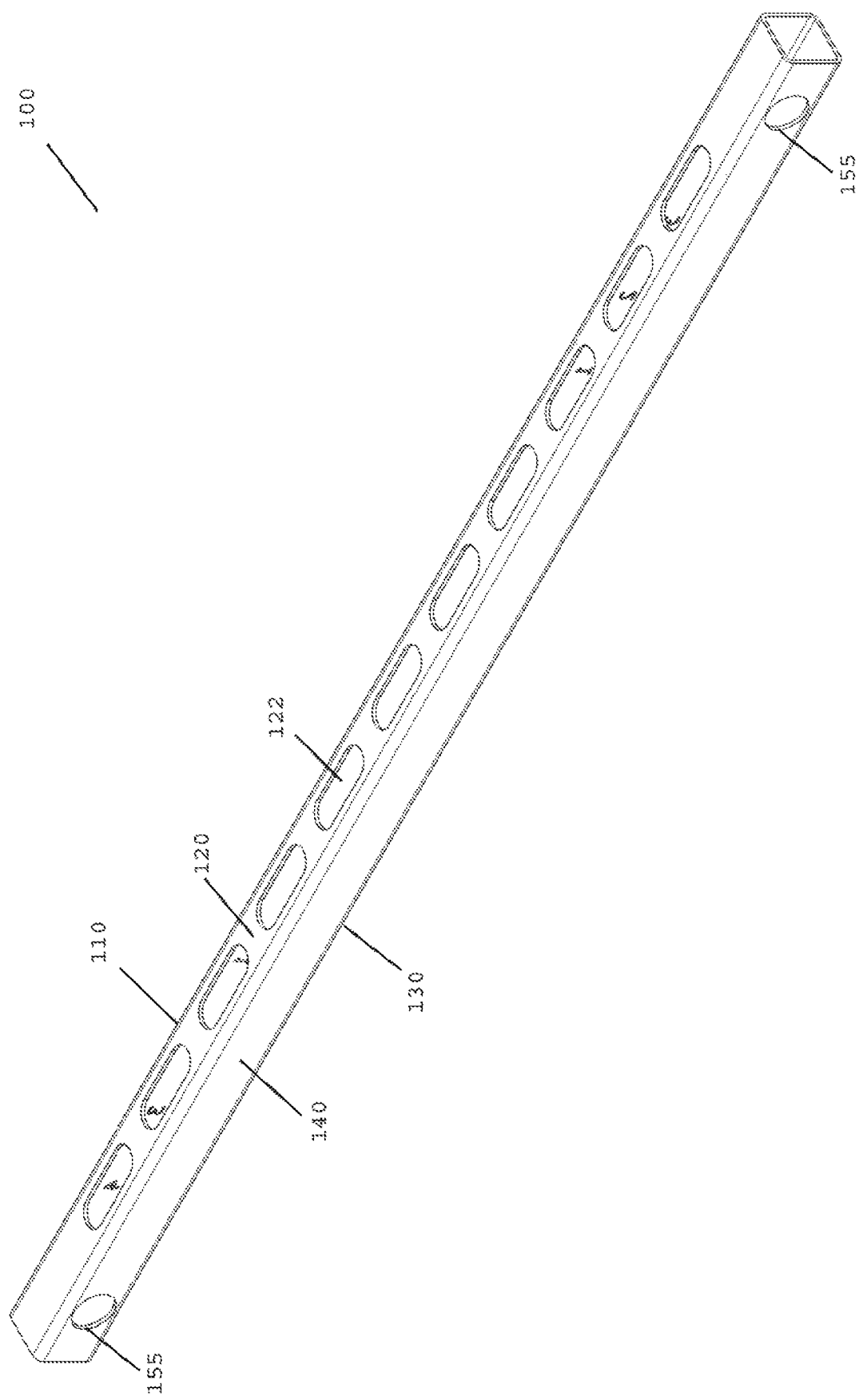
FIG. 12 is a perspective illustration of an example support beam portion of the example kit of FIG. 1, showing the bottom and a side thereof.
Figure 17:
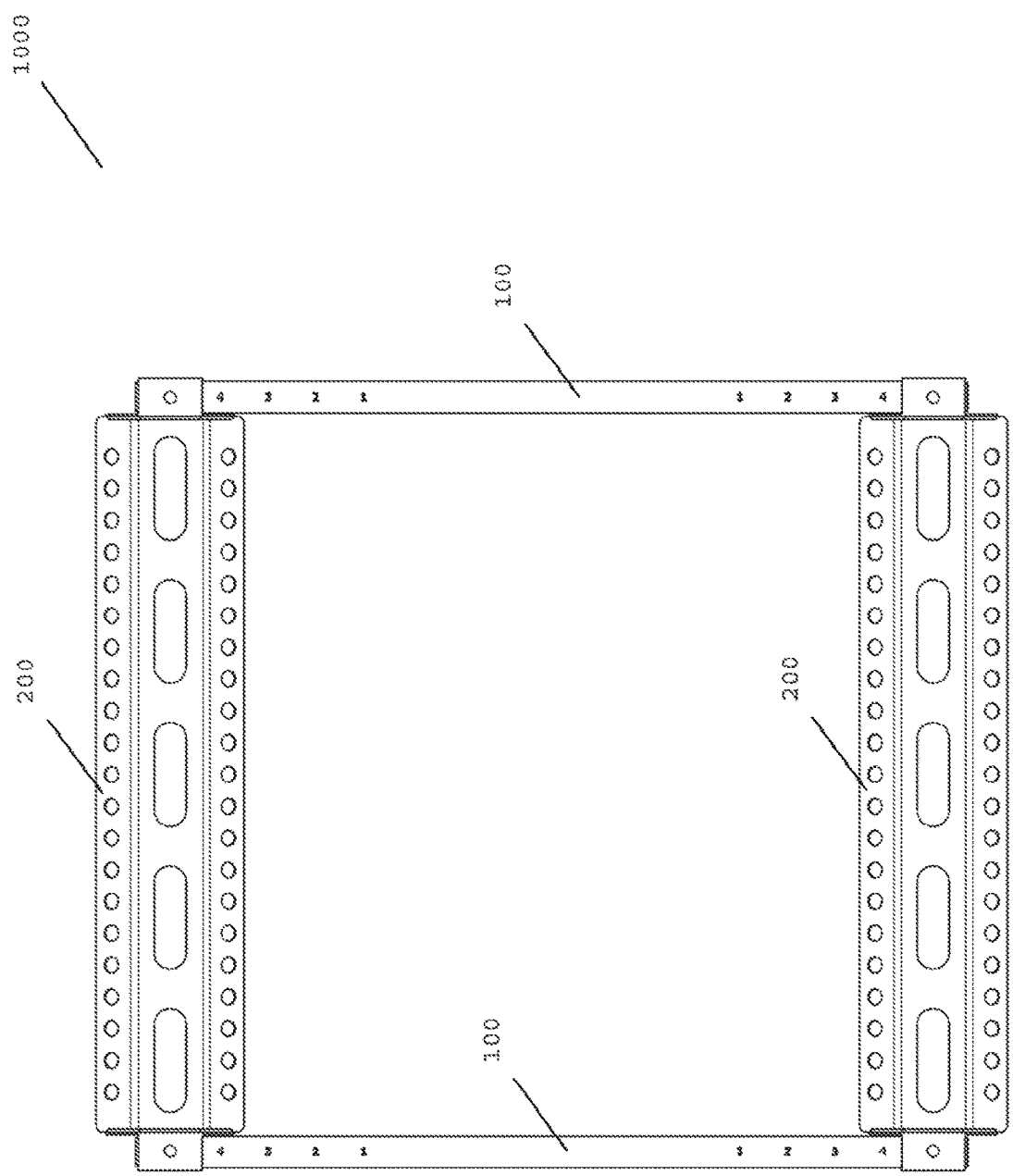
FIG. 17 is a top plan view of certain components of the example kit for lifting vehicles of FIG. 1.
Figure 18:
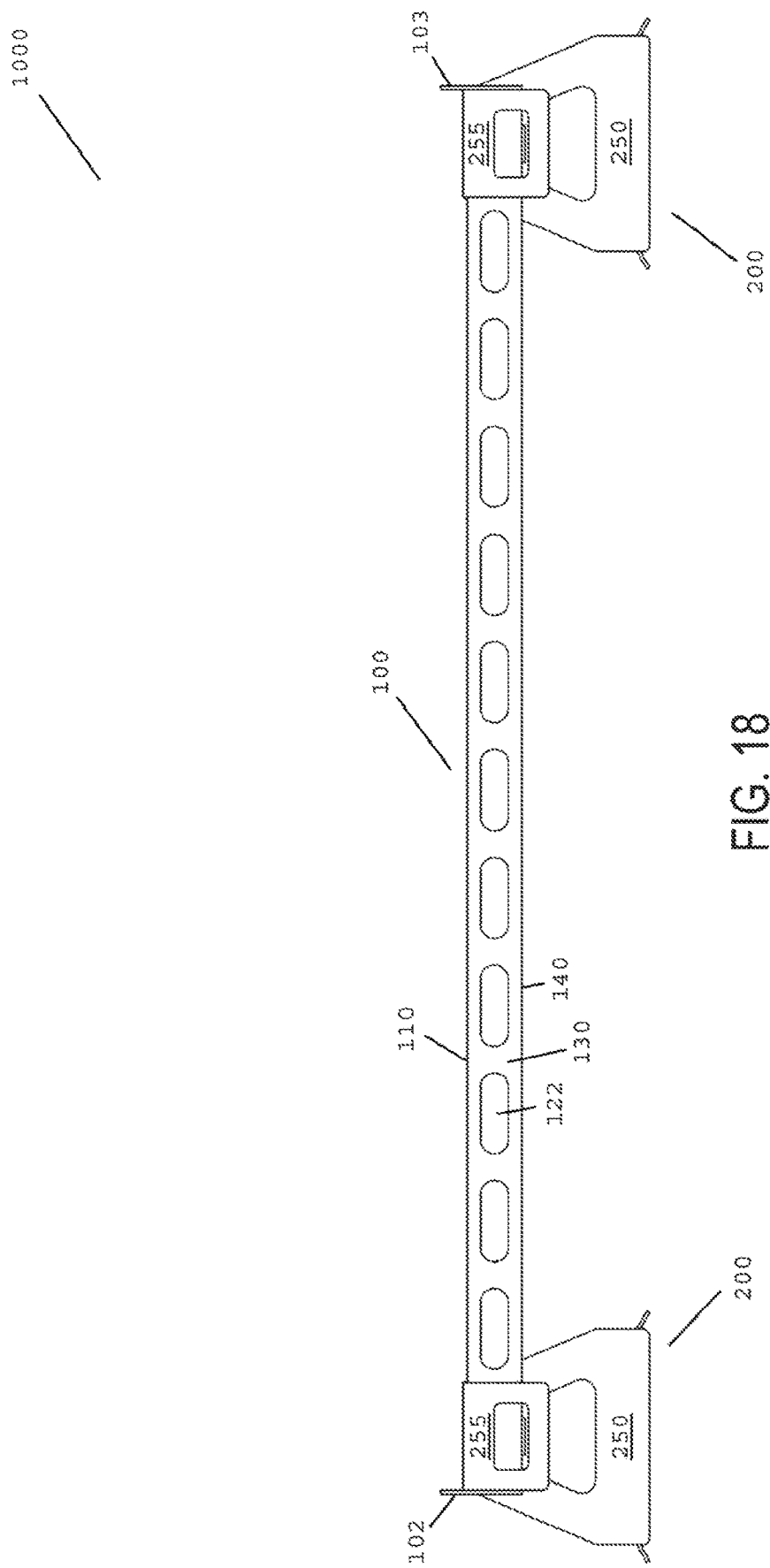
FIG. 18 is a side elevation view of certain components of the example kit for lifting vehicles of FIG. 1.
Figure 21:
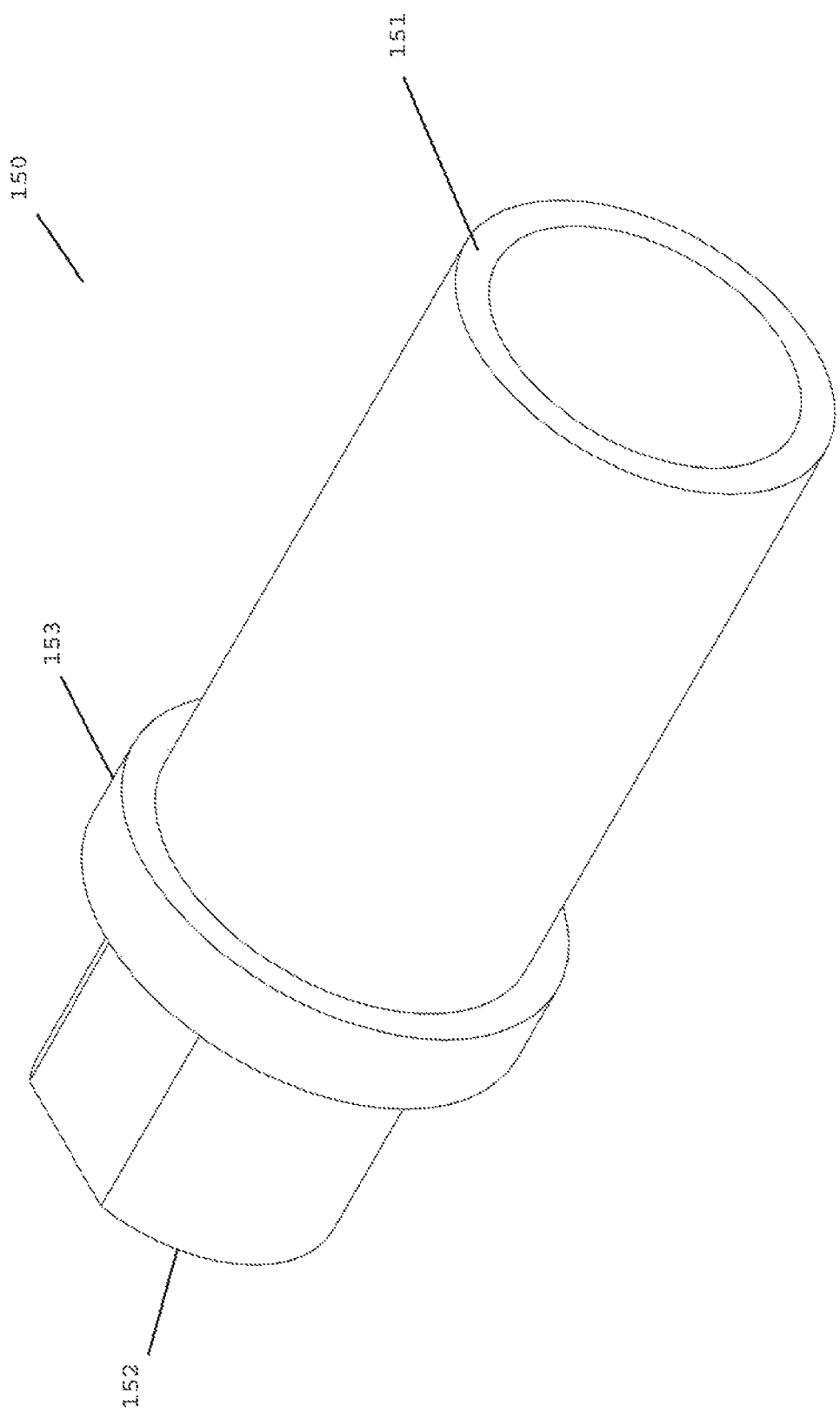
FIG. 21 is a perspective illustration of an example adapter extending from a first end configured to removably engage a hole in the vehicle support pad structure as shown in FIG. 3A to a second end configured to removably engage a hole in the support beam.

While two-post vehicle lifts 2000 may utilize a variety of support pad types for lifting vehicles in normal use, in most instances those support pads are easily removable, leaving a hole 2350 or similar structure proximate a terminal end thereof (FIG. 3A). Systems 1000 may be configured for use with any geometry of support pad structure 2350. Where the support pad structure 2350 comprises a hole as shown in FIG. 3A, an adapter 150 (FIG. 21) may be used that is configured to removably engage with a hole in the lifting arm 2300 and with a hole 155 in a support beam 100 (FIG. 12). For example as shown in FIG. 21, such an adapter 150 may be formed from steel, for example, and may comprise a generally cylindrical body extending from a first end 151 configured to slide within and removably engage a correspondingly-dimensioned hole 155 in a support beam 100, to a second end 152 configured to slide within and removably engage a correspondingly-dimensioned hole 2350 near the distal end of retractable lifting arm 2300 of a two-post lift 2000 (FIG. 3A). The second end 152 may be threaded to receive an optional fastener (not shown) to removably fasten the adapter 150 into the support pad structure 2350. A shoulder 153 may be provided support the adapter 150 upon the support pad structure 2350. The longitudinal length of adapter 150 may be selected in view of the vertical height of the lifting arm 2300 when it is in its lowest position. In certain kits 1000, various adapters 150 of different dimensions may be provided to adapt the kit 1000 to a variety of two-post lifts 2000.

Figure 11:
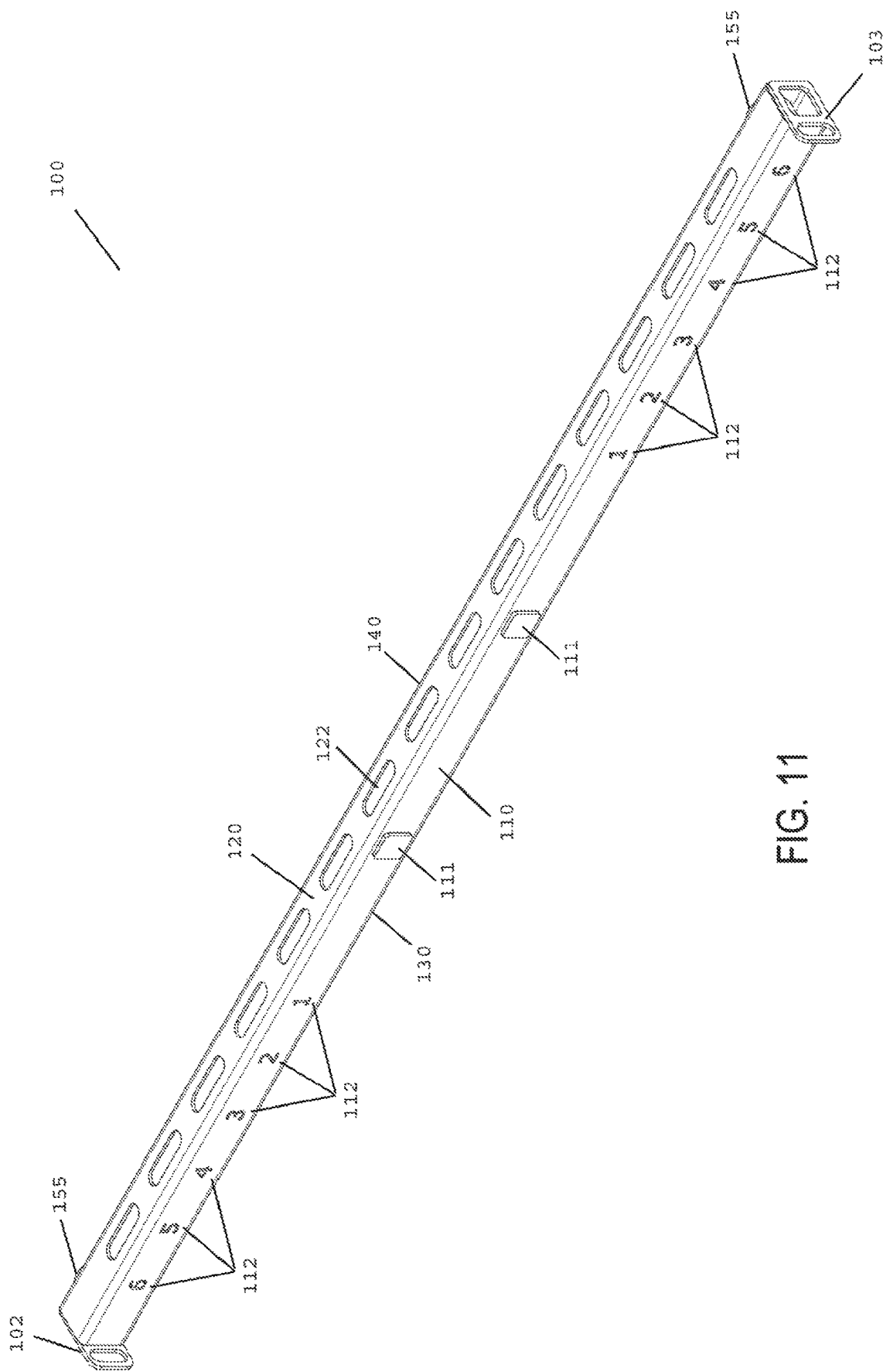
FIG. 11 is a perspective illustration of an example support beam portion of the example kit of FIG. 1, showing the top and a side thereof.

The kit 1000 may further comprise a pair of support beams 100 each extending longitudinally from a front end 102 to a back end 103 (FIG. 11). Support beams 100 may each comprise at least two arm connection structures, such as holes 155 on a lower surface 140 of support beams 100 (FIG. 12), each configured to removably engage and be supported by one of the vehicle support pad structures 2350, for instance via adapter 150 (FIG. 21) as described above. While arm connection structures 155 are shown in this example embodiment as holes configured to receive adapters 150, any suitable geometry of connection structure 155 may be provided to interface with support pad structure 2350. In one example embodiments, the connection structures 155 are holes located 118 inches apart in the lower side 140 of a support beam 100. Support beams 100 may comprise any suitable geometry and material, such as, for example, steel square tubing of substantially uniform cross-section. To keep the kit 1000 as light as possible, lightening holes 122 may be provided wherever appropriate, such as on left side 120 and right side 130 of each support beam 100. An upper or top surface 110 of each support beam 100 may be provided with centrally-located protrusions 111, such as squares of plate steel welded to top surface 110, to act as stoppers to prevent the pair of baskets 200 from being moved too close together or both moved to one end of the beams 100. Equally or correspondingly-spaced numbers or other markings 112 may be applied to or formed in top surface 110 to assist a user in selectably locating the baskets 200 in various positions on the support beams 100. The distal ends of the support beams 100 may be provided with stopper plates 102, 103 that extend above the upper surface 110 of the support beams 100 to prevent the baskets 200 from sliding off the ends of the support beams 100. Lightening holes 104, 105 (FIG. 15) may be provided in stopper plates 102, 103. Throughout this description the upper or upward direction is designated by the upward pointing arrows in FIG. 5, while the lower or downward direction would be the opposite thereof.

Figure 1:
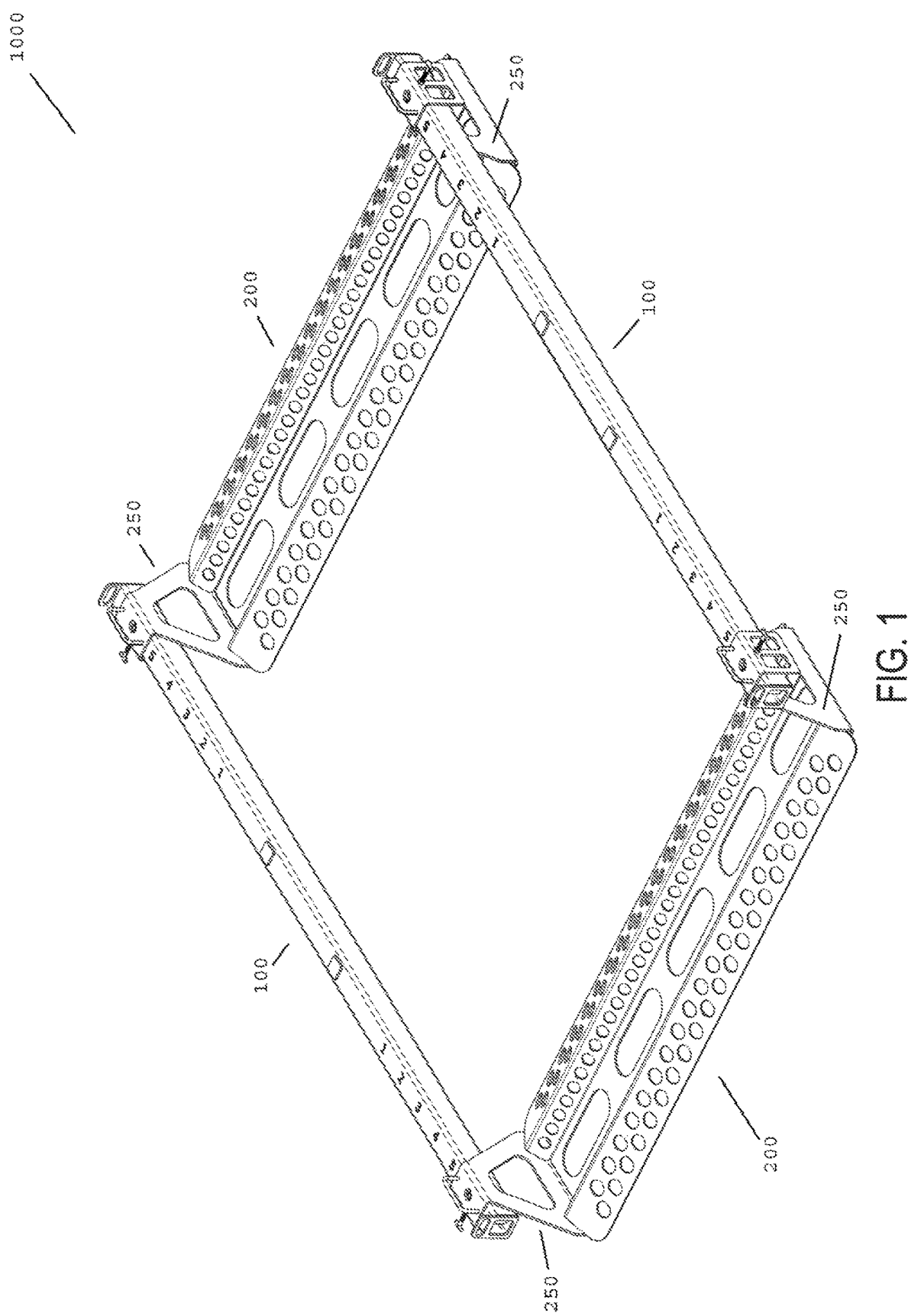
FIG. 1 is a perspective illustration of an example embodiment of certain elements of a kit for lifting vehicles, shown in an assembled position.
Figure 2:
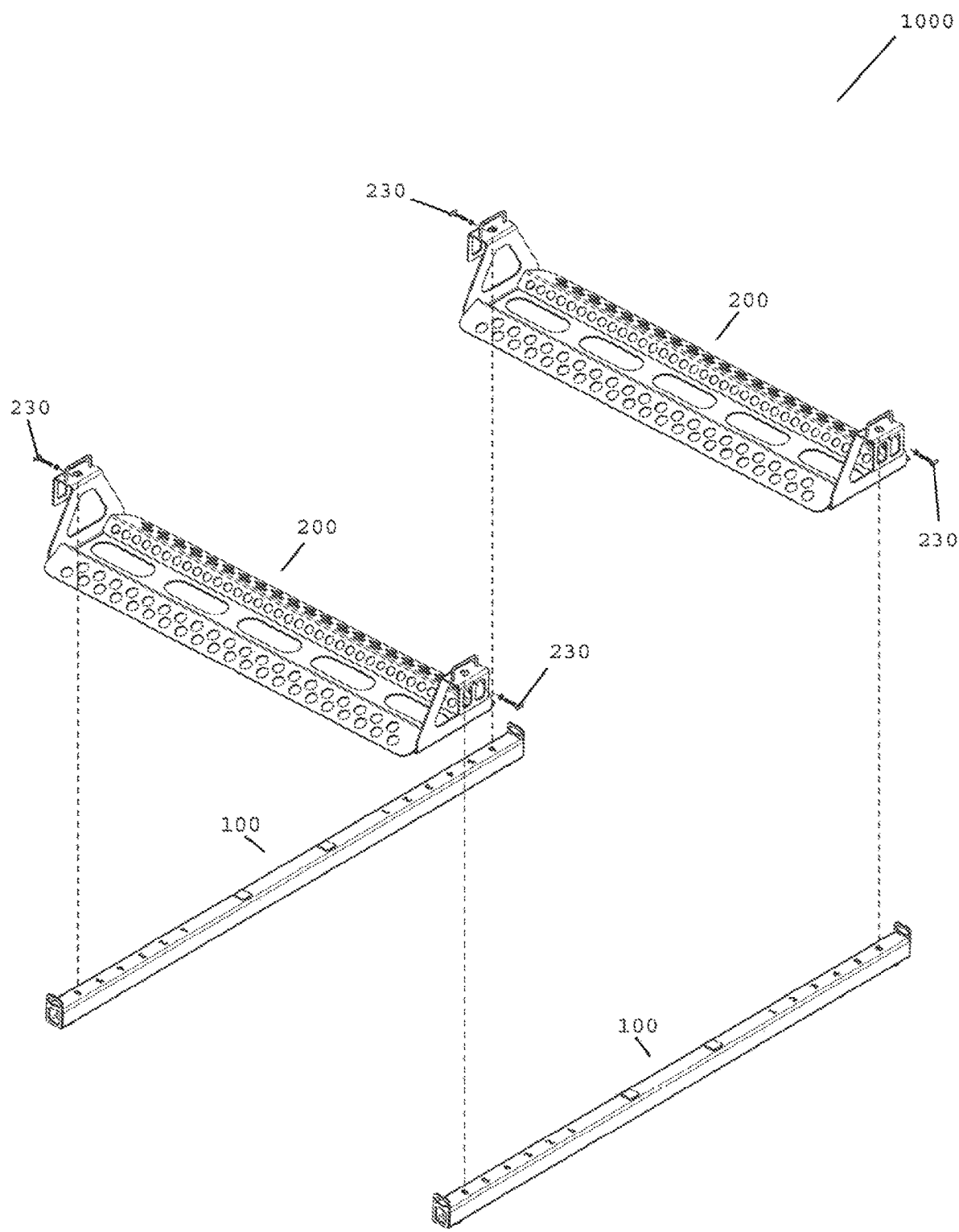
FIG. 2 is an exploded view of the example embodiment of FIG. 1.
Figure 4:
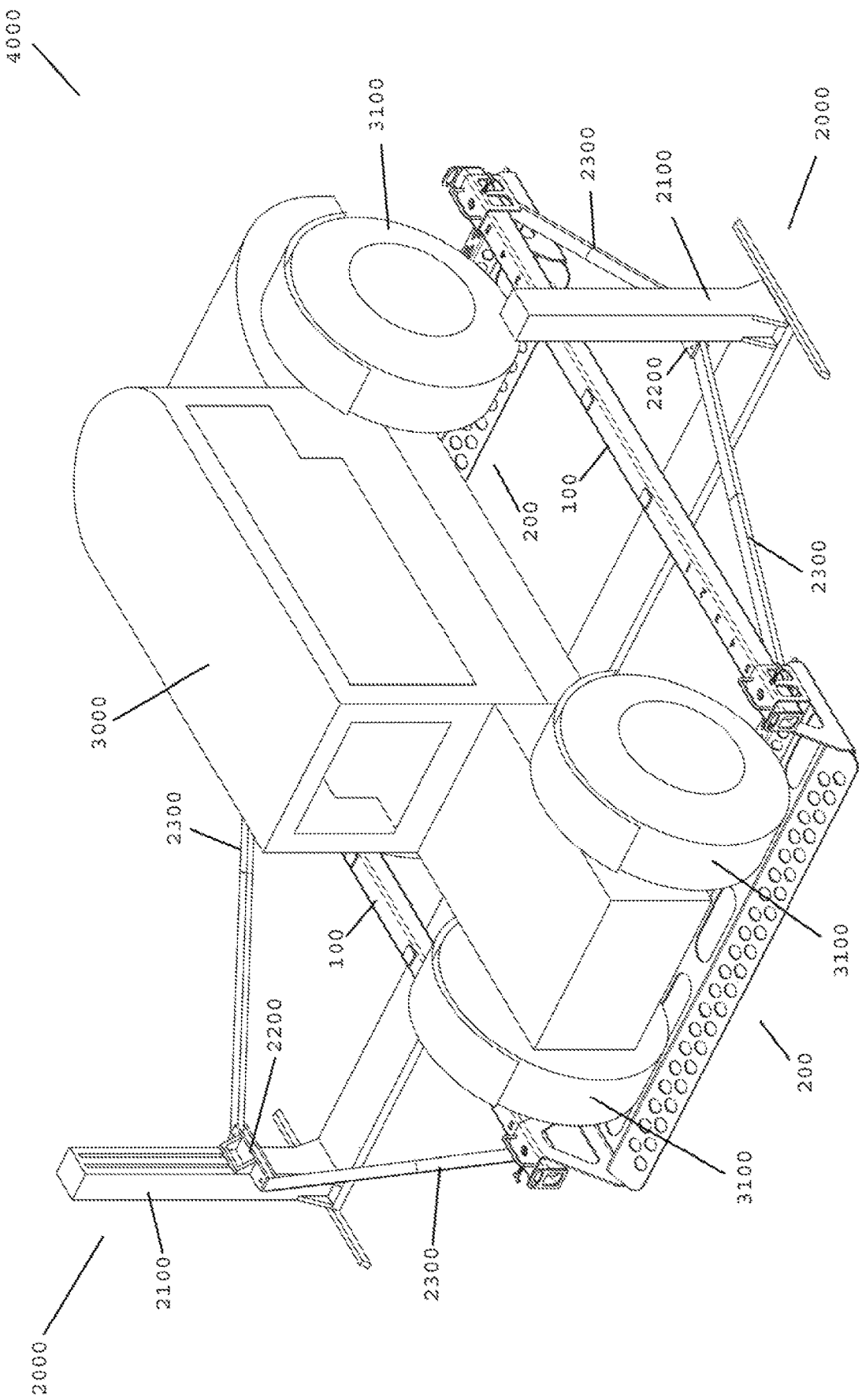
FIG. 4 is a perspective illustration of the system of FIG. 3, showing an example vehicle thereon in a lowered position.
Figure 5:
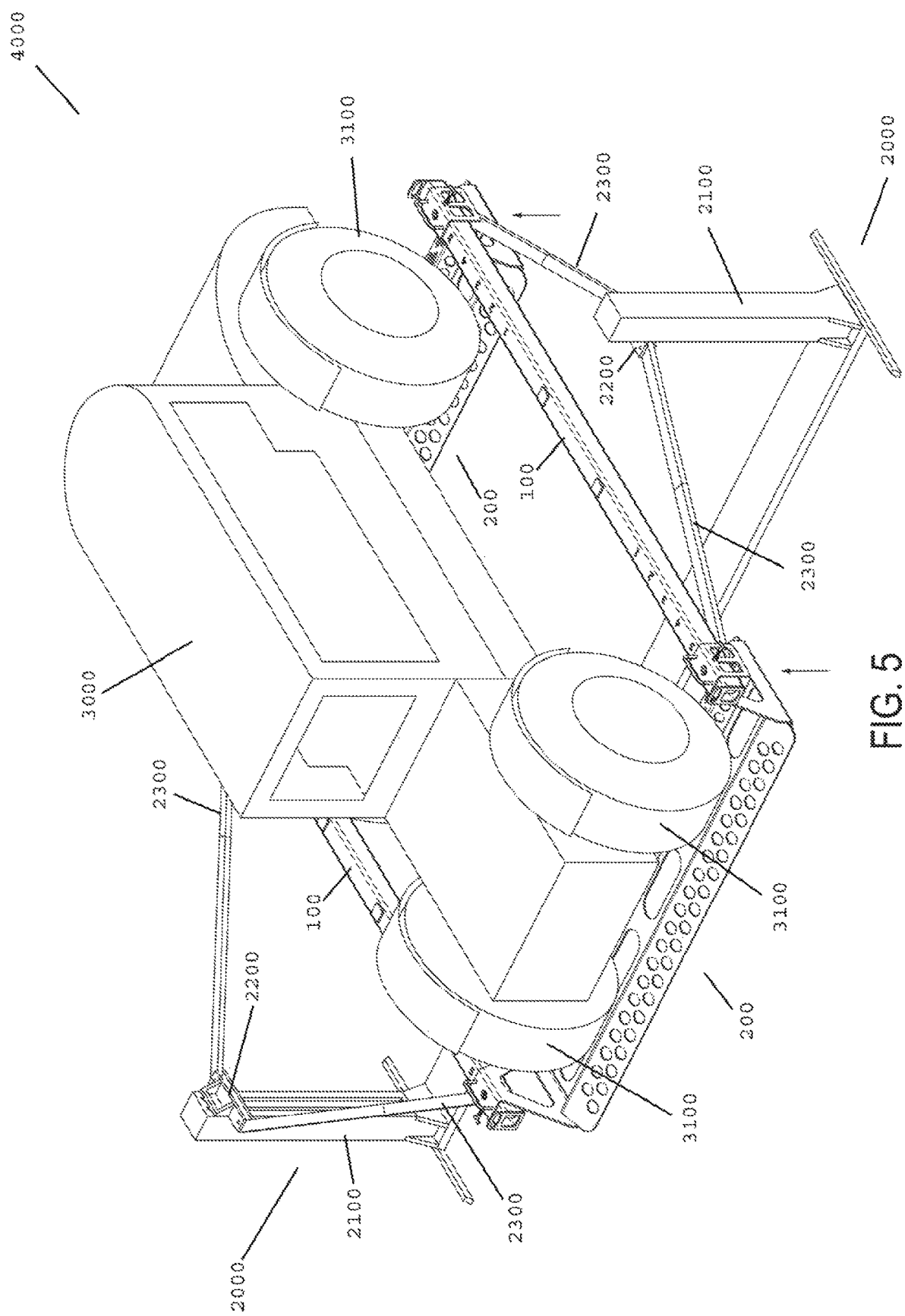
FIG. 5 is a perspective illustration of the system of FIG. 3, showing an example vehicle thereon in a raised position.
Figure 6:
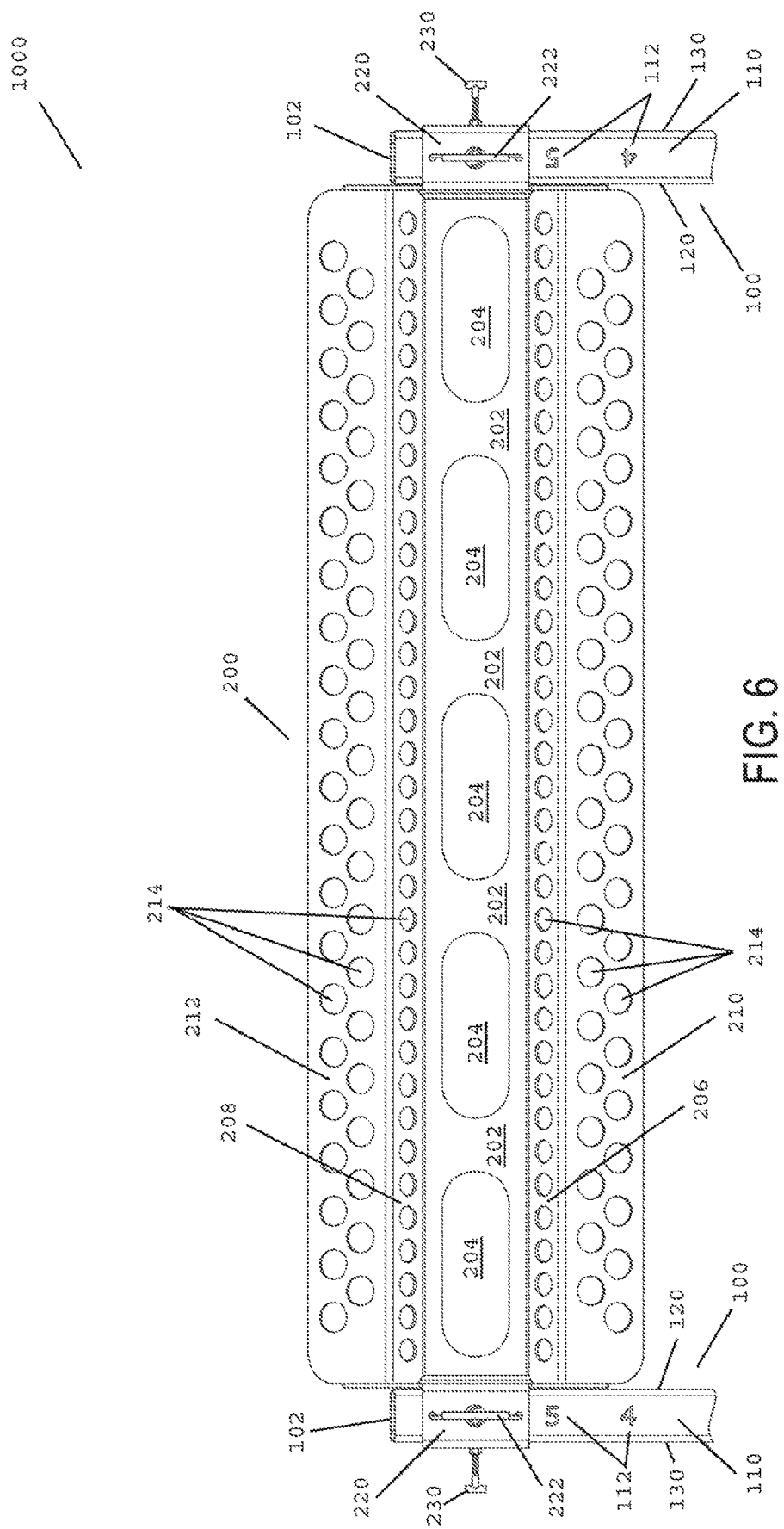
FIG. 6 is a top plan view of a portion of the example kit of FIG. 1.
Figure 7:
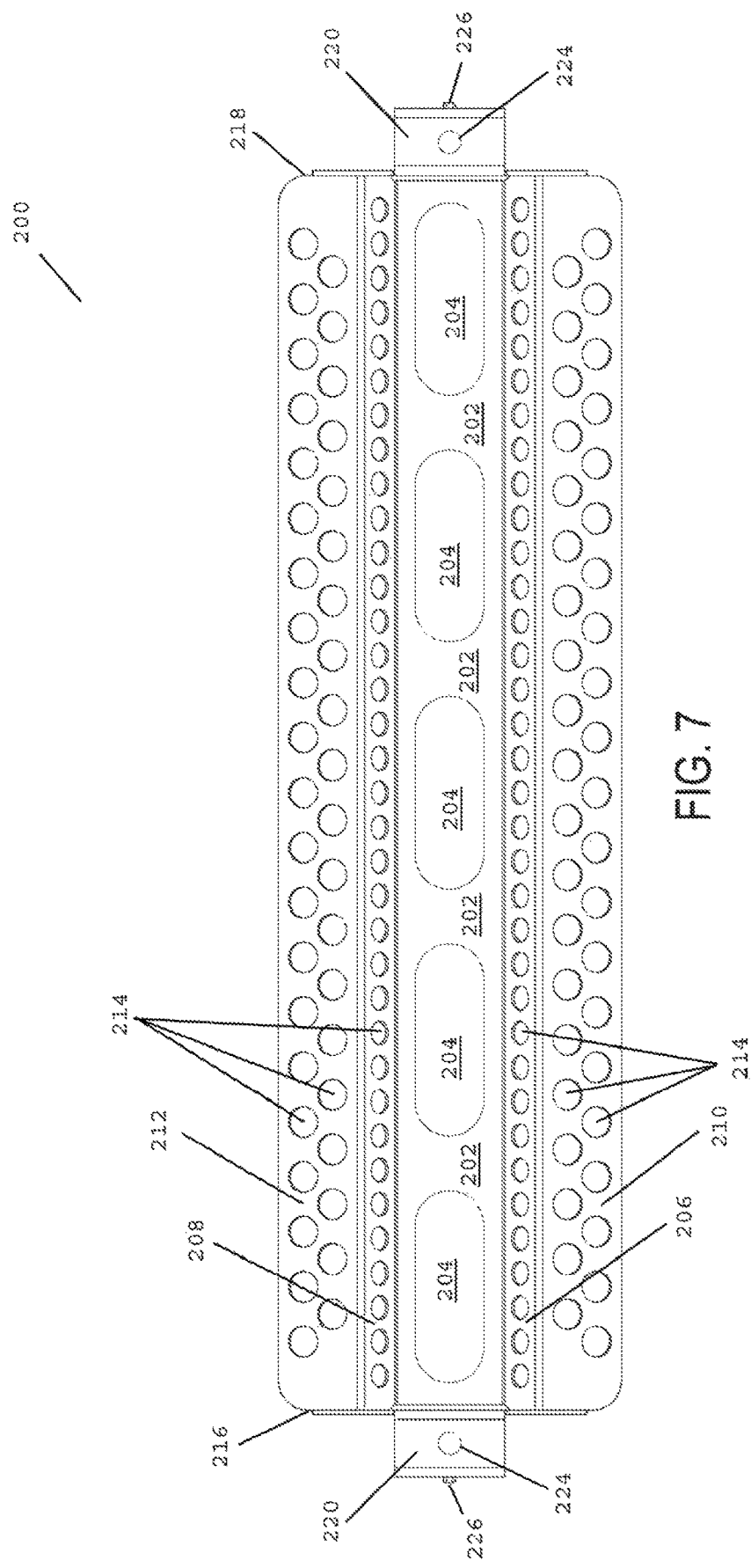
FIG. 7 is a top plan view of an example basket portion of the example kit of FIG.
Figure 19:
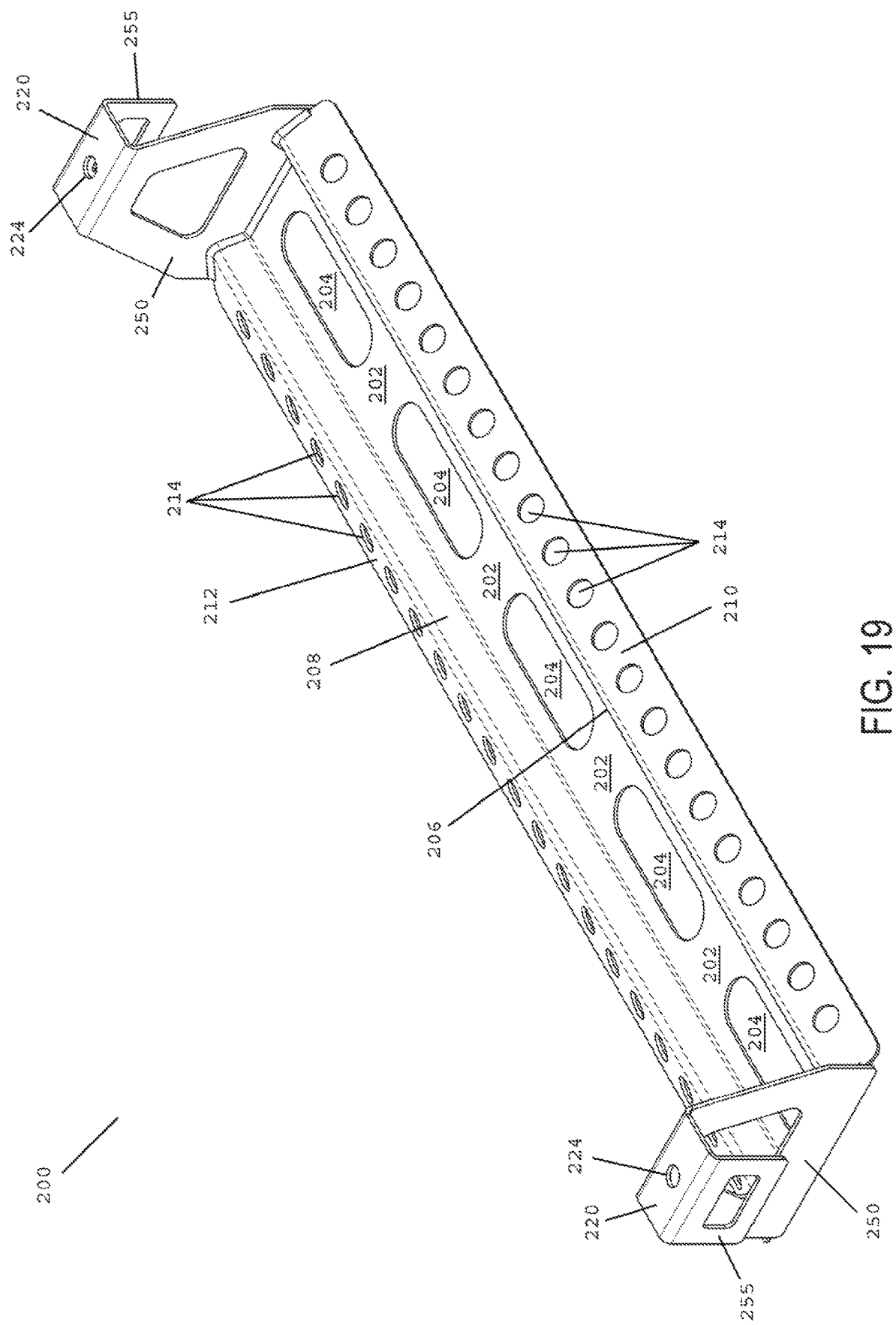
FIG. 19 is a perspective illustration of an example basket portion of the example kit of FIG. 1, showing the top and a side thereof.

A pair of baskets 200 may be configured to support a vehicle 3000, each basket 200 having an upwardly-concave cross-sectional profile defining a concavity having a depth and width configured to cradle a tire 3100 on a vehicle 3000, as shown in FIGS. 4 and 5. For example, such an upwardly-concave cross-sectional profile may be defined by a bottom interior surface 202 connected to both a front inclined surface 206 and a rear inclined surface 208 (FIGS. 7, 19). Such an upwardly-concave cross-sectional profile may extend from a first end 216 to a second end 218 (FIG. 7) between first and second transversely spaced hanging structures 250 (FIGS. 1, 19). In various example embodiments the upwardly-concave cross-section of each basket 200 may further comprise front and rear inclined ramps 210, 212 extending centrally inward from a ground or floor level (when the lift 2000 is in a lower position, for instance as shown in FIG. 4) up to the upper portions of front inclined surface 206 and rear inclined surface 208, respectively, to facilitate a tire 3100 of a vehicle 300 driving into, over, and out of each basket 200 when the lift 2000 is in the lower position. Baskets 200 may be formed from any suitable material, such as plate steel, for example. In certain example embodiments each basket 200 has a capacity of lifting 3,500 pounds, and the overall system 1000 has a capacity of lifting 7,000 pounds. To keep the kit 1000 as light as possible, lightening holes 204 and 214 may be provided wherever appropriate, such as shown in FIG. 6, for example.

Figure 8:
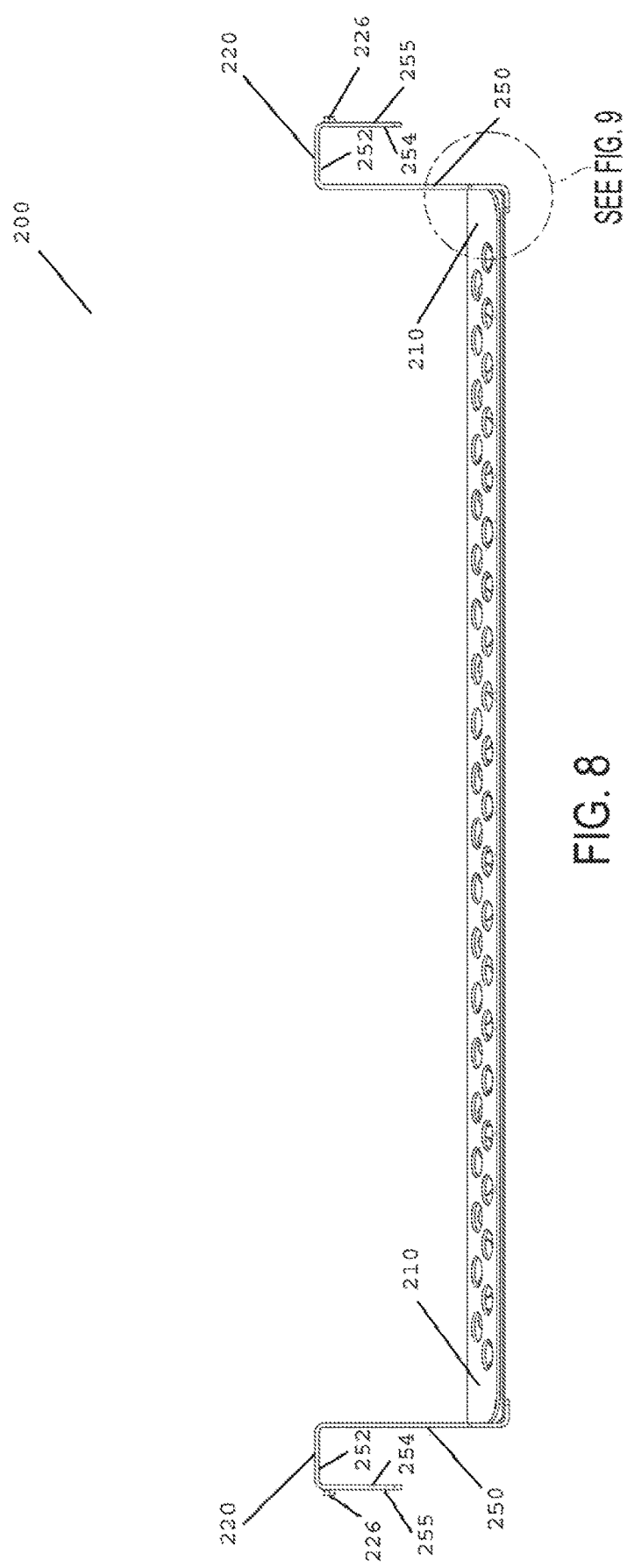
FIG. 8 is a front elevation view of the example basket portion of FIG. 7.
Figure 9:
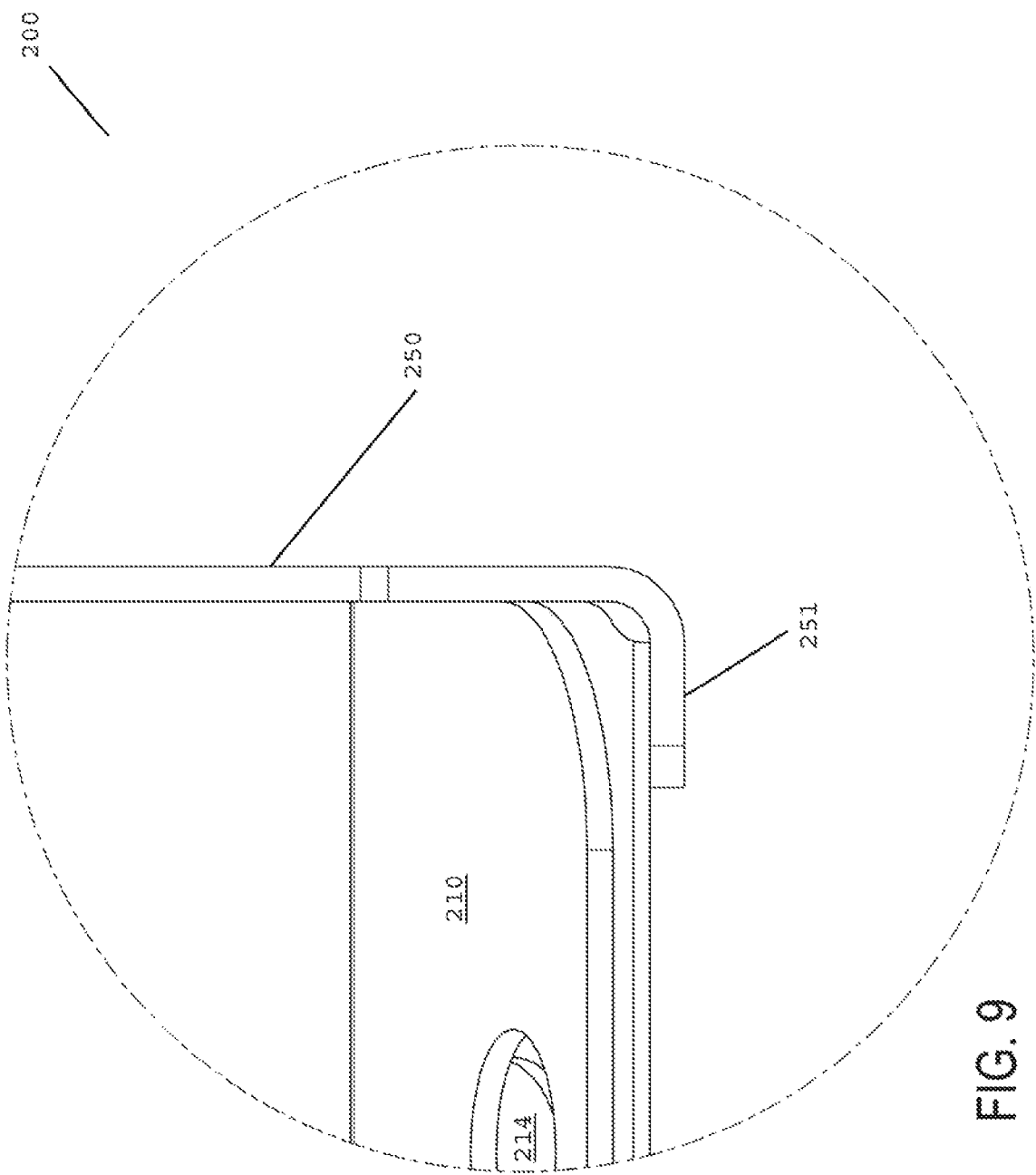
FIG. 9 is a detail view of a portion of the example basket shown in FIG. 8.
Figure 10:
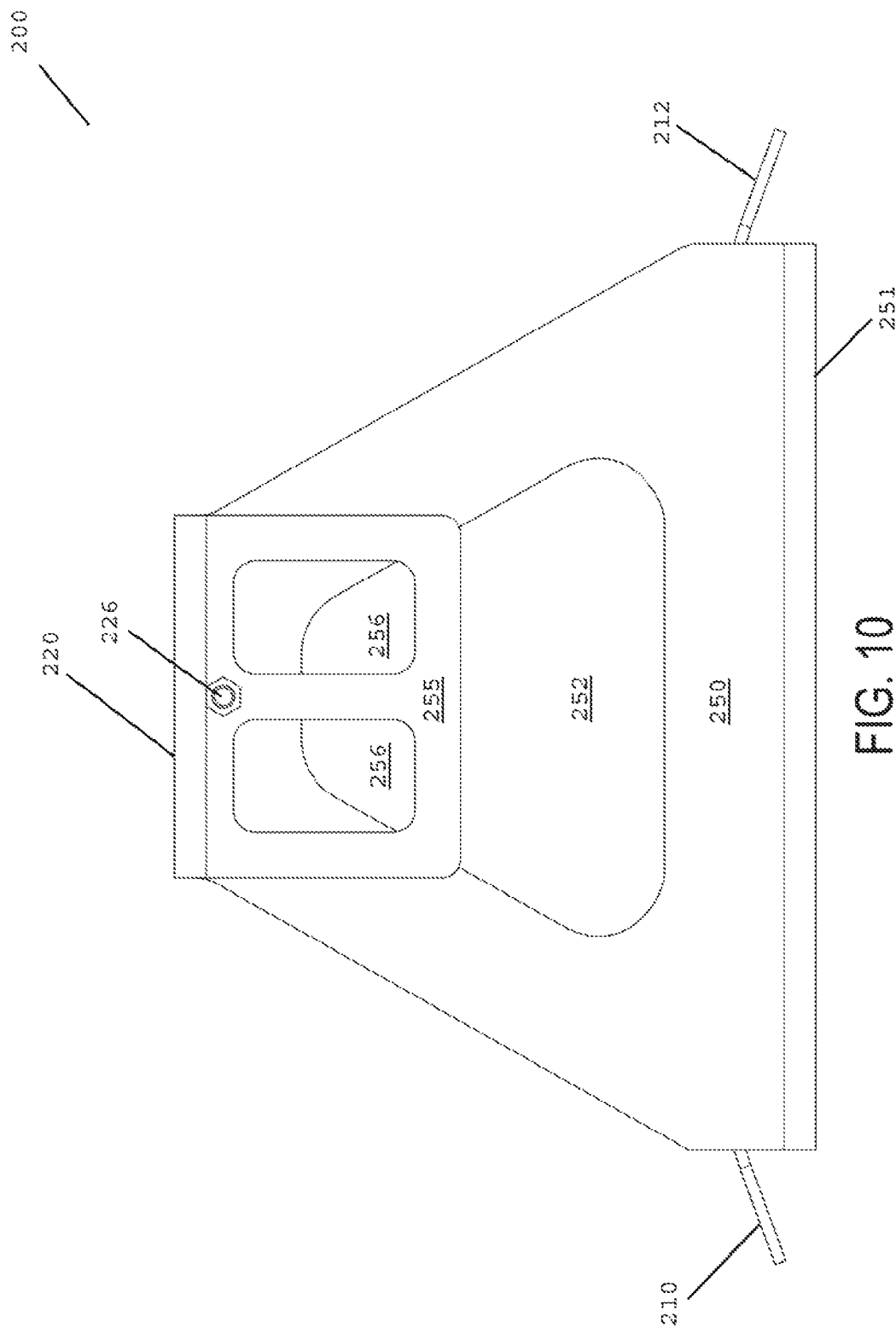
FIG. 10 is a side elevation view of the example basket portion of FIG. 7.
Figure 20:
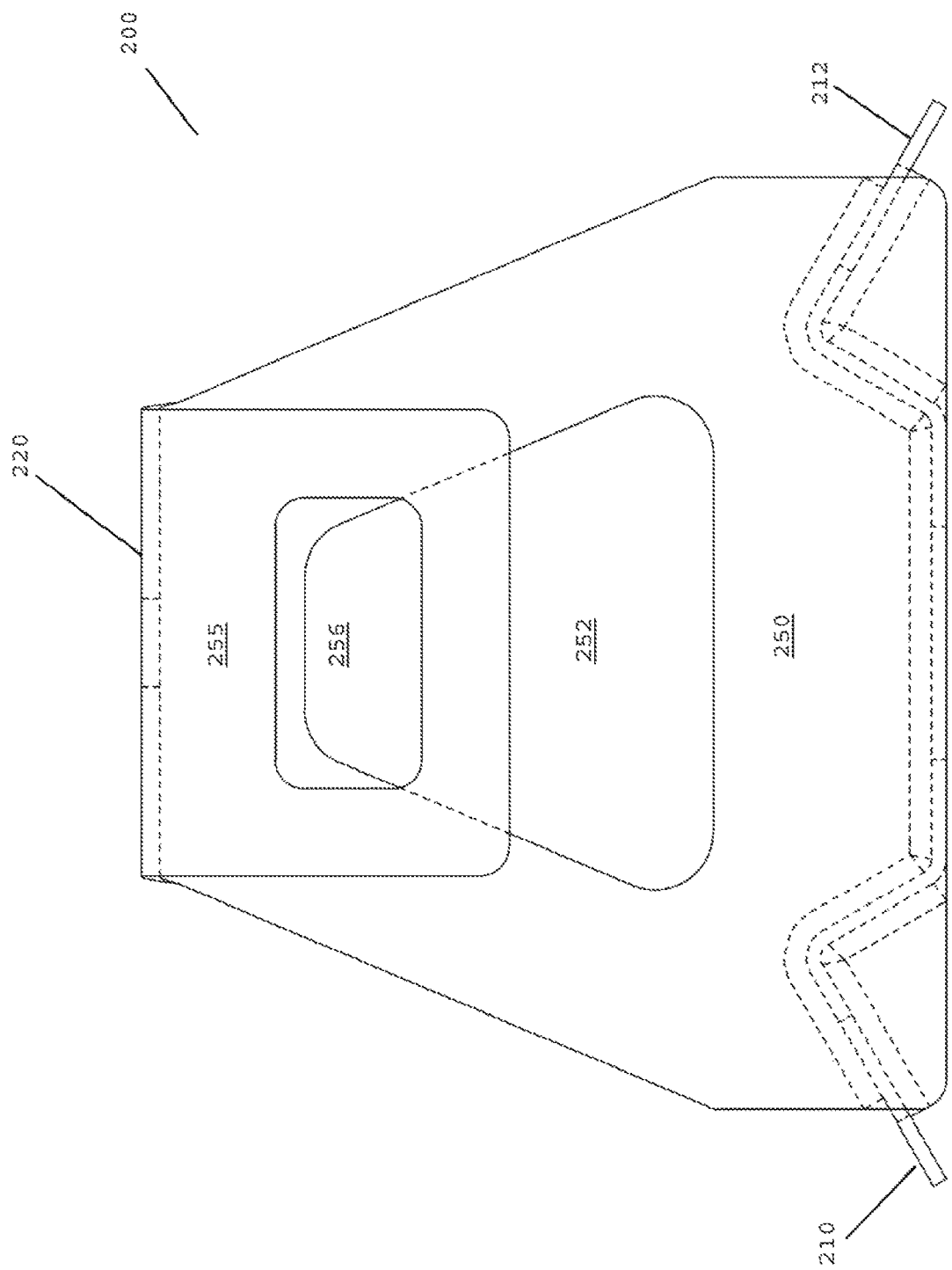
FIG. 20 is a side elevation view of certain aspects of the example basket portion of FIG. 7, showing hidden lines.

Each hanging structure 250 may be configured to be removably and selectably attached with and supported by one of the support beams 100 at any of a plurality of longitudinally-spaced mounting positions (for instance, numbered positions 112 shown in FIG. 11, or any positions there-between) on the support beam 100. In various example embodiments each support beam 100 may have a substantially uniform cross-section having at least a left side 120, a top side 110, and a right side 130, and each hanging structure 250 on each basket 200 may be configured to removably engage the left side 120, top side 110, and right side 130 of a support beam 100 with corresponding surfaces 250, 252, and 254 (FIG. 8), so that the baskets 200 may slide longitudinally upon and be guided by longitudinally-extending support beams 100. For example, as depicted in FIGS. 8 and 9, each hanging structure located at the left and right ends 216, 218 of the baskets 200 may comprise a bracket 250 that extends vertically upward from below the bottom interior surface 202 (for instance, from tab 251) to an upper portion configured to slide proximate the left side 120 of a support beam 100, and then bends horizontally outward into a top portion 220 having an inner surface 252 configured to slide upon the top surface 110 of a support beam 100, which then bends vertically downward into a vertical portion 255 having an inner surface 254 configured to slide proximate the right side 130 of a support beam 100. Lightening holes 252, 256 may be provided in brackets 250, 255, as shown in FIG. 20. Additionally, viewing portals or through holes 224 may be formed in top portions 220 that may be configured to allow a user to see the marking 112 (FIG. 11) on the top surface 110 of the support beam 100 corresponding to the longitudinal location of the basket 200 on the support beam 100.

While the Figures show the baskets 200 moved to their outermost locations on the support beams 100 adjacent stopper plates 102, 103, it is understood that the baskets 200 may be selectively slid inwards toward each other to any location on support beams 100, subject to the presence of any protrusions 111 on the (FIGS. 13, 14), to correspond to the wheelbase length of a vehicle 3000. In certain example embodiments the baskets 200 may be moved from positions where their respective centerlines are from 26 inches apart to 128 inches apart, for example. Handles 222 (FIGS. 1, 6) may be provided to facilitate movement of the baskets 200, such as handles 222 extending upward from top portions 220 of the baskets 200, for example. To hold the baskets 200 in place once they are positioned along the support beams 100 in a desired location, each hanging structure 250 may be configured to be removably and selectably attached with the support beams 100 by one or more threaded members 230 (FIG. 6). Threaded members 230 may be connected with the hanging structure 250, for instance by being screwed into a threaded hole 226 in bracket 255 (FIG. 8), and may be oriented to pinch the support beam 100 against the hanging structure, for instance against the upper portion of bracket 250, when the threaded member 230 is hand-tightened, and to release the hanging structure 250 from the support beam 100 when the threaded member 230 is hand-loosened. For example, a T-handle fastener can be used as a threaded member 230.

Figure 22:
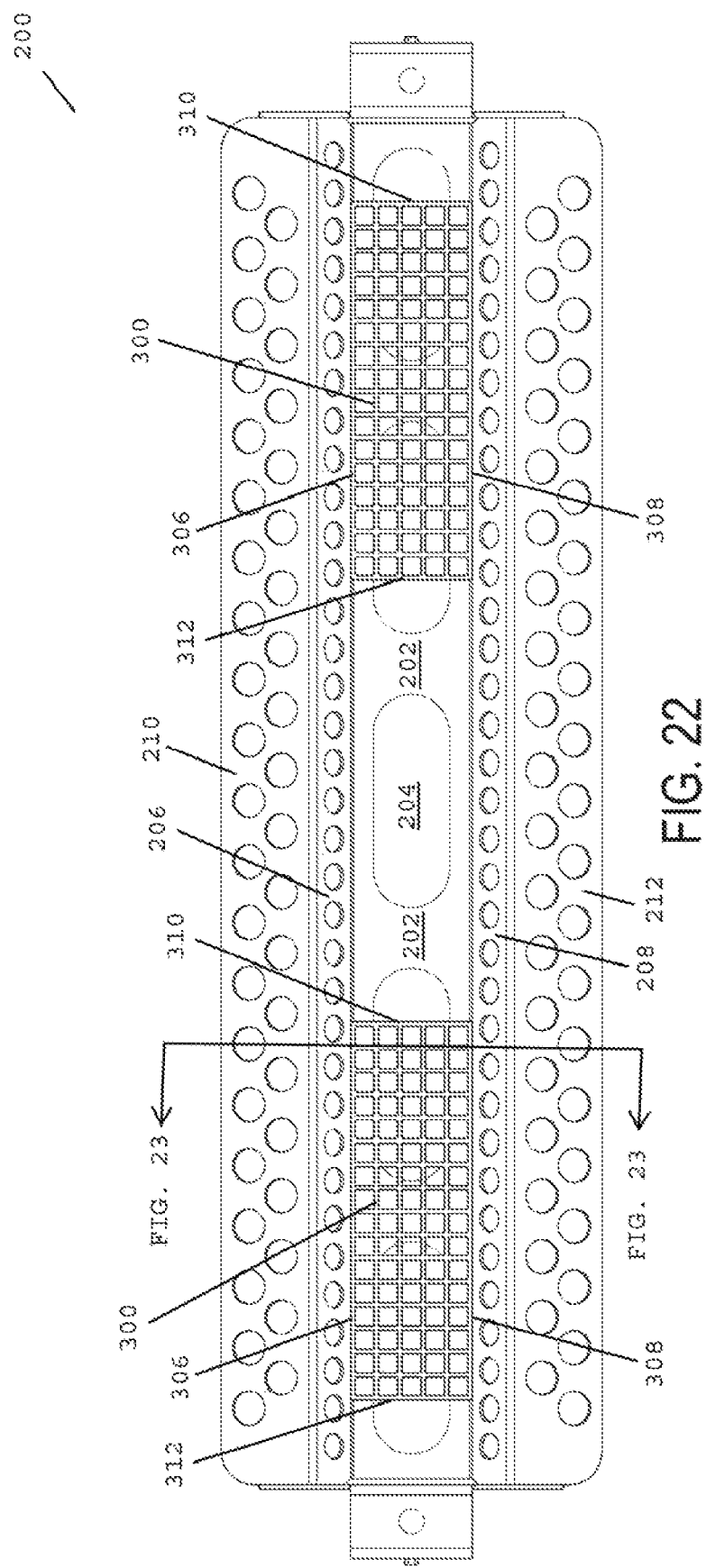
FIG. 22 is a top plan view of the example basket portion of FIG. 7, showing two example spacer plates located in the upward concavity of the example basket portion.
Figure 23:
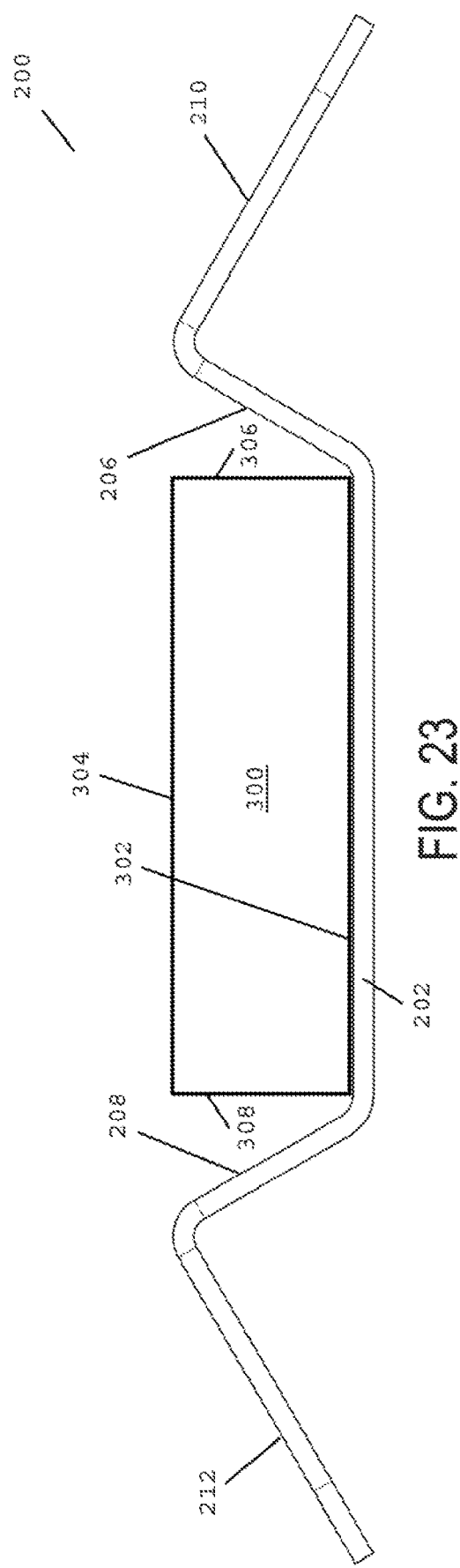
FIG. 23 is a section view of through the example basket portion and spacer plate of FIG. 22, with section cross-hatching omitted for clarity.
Figure 24:
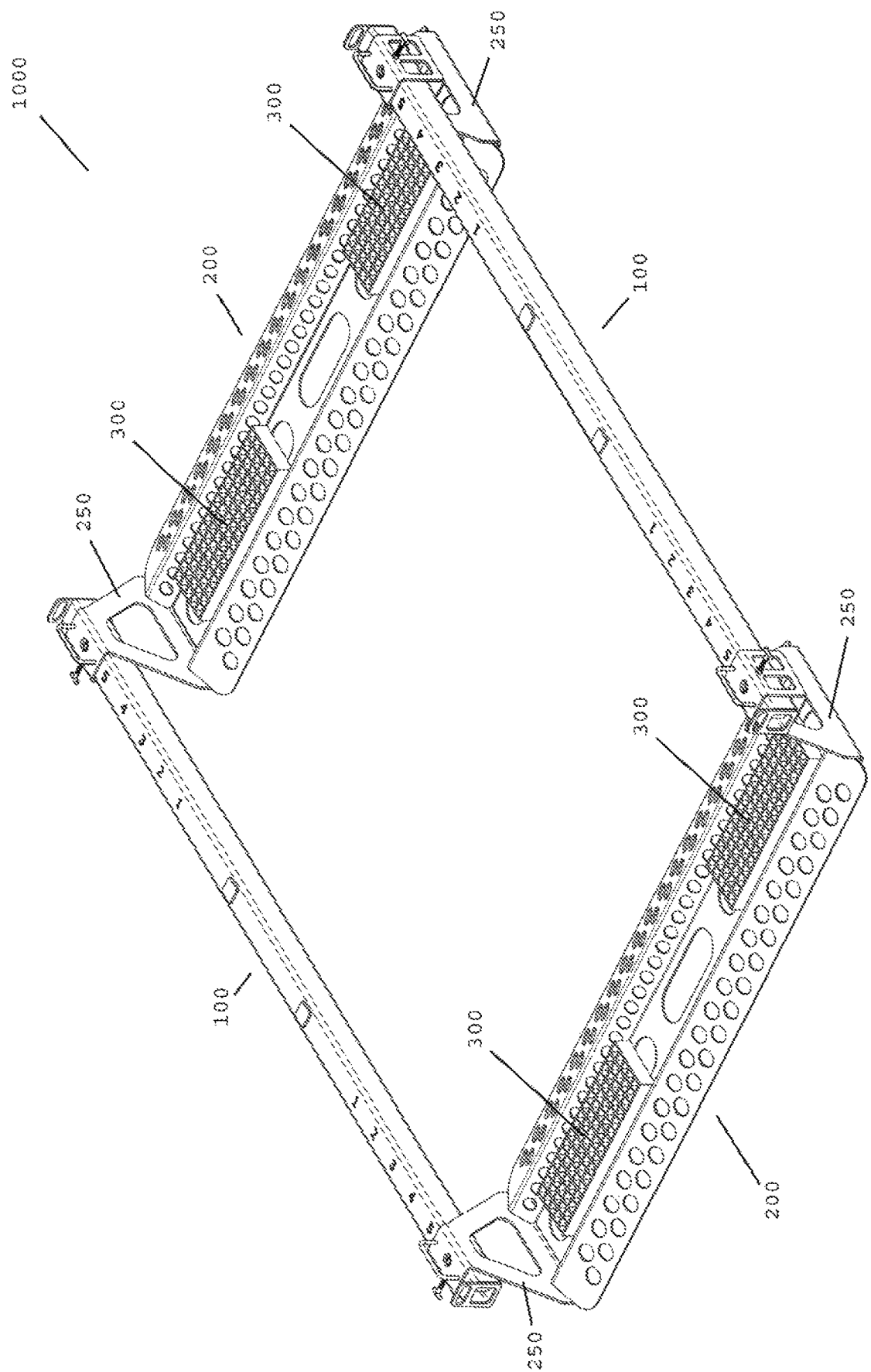
FIG. 24 is a perspective illustration of the example embodiment of FIG. 1, shown with the example spacer plates of FIG. 22 located in the upward concavities of the example basket portions.

With respect to FIGS. 22-24, in various example embodiments the upwardly-concave cross-sectional profile defined by surfaces 202, 206, 208 to create a concavity having a depth and width configured to cradle a tire 3100 on a vehicle 3000, may further comprise one or more spacer plates 300 sized and shaped to fit in the upwardly-concave cross-section and reduce the depth of the concavity, so that certain vehicles 3000 do not get stuck on the lift system 4000, or alternatively to adapt the system 4000 for use with tracked vehicles that use tracks instead of wheels and tires. For example, a spacer plate 300 may comprise a body extending from a left side 312 to a right side 310 from a front side 308 to a back side 306, with a lower surface 302 sized to fit on lower interior surface 202 of basket 200, extending vertically upward from the lower surface 302 to an upper surface 304 having an installed height approximately the same as, or less than, or more than, the height of the upper portions of angled sides 206, 208. Typically the installed vertical height of the upper surface 304 of the spacer plate 300 will be less than the height of the upper portions of angled sides 206, 208, so that the basket 200 continues to cradle the tire 3100 of the vehicle 3000 to some degree. But when used for tracked vehicles, the installed vertical height of the upper surface 304 of the spacer plate 300 may be about the same as the height of the upper portions of angled sides 206, 208. While spacer plates 300 may be formed from any suitable material, to minimize weight, spacer plates may be formed from high-strength plastic in a honeycomb or waffle-like geometry as shown in the Figures, and separate ones may be used for the left and right side tires of the vehicle (FIGS. 22, 24).

Examples of the kit 1000 and system 4000 will now be described in use. In various example embodiments steps of use may include:

Ordering the kit 1000 with the proper adapter 150 to match the style of the lift 2000.

Checking the floor where the lift 2000 is located to ensure that it is a sufficiently level, flat surface.

Unpackaging the kit 1000 and hand-loosening the threaded members 230 on each basket 200 until they are flush with inner surface 254 (FIG. 8).

Lowering two-post lift 2000 and fully extending arms 2300.

Removing lifting pads (not shown) and installing height adapters 150 to achieve a minimum height from floor to top of adapters, for example, 12 inches in certain example embodiments.

Moving the arms 2300 so they are positioned symmetrically about the vertical transversely spaced columns 2100 and so that the adapters 150 are the same distance apart as connection structures 155 in the lower surfaces 140 of the support beams 100, for example, 118 inches in certain example embodiments.

Installing each support beam 100 over the adapters 150 so that the adapters 150 removably attach with the connection structures 155 in lower surfaces 140 of the support beams 100.

Mounting each basket 200 onto the support beams 100, one basket 200 forward of the columns 2100 and one basket 200 rearward of the columns 2100.

Measuring the wheelbase of the vehicle 3000 that is to be lifted and then moving the baskets 200 along the support beams 100 until the distance between the longitudinal centerlines of the baskets 200 matches the desired wheelbase.

Raising the lift 2000 until the top 110 of the support beam 100 meets the inner surface 252 of the upper portion 220 of the support bracket 250 of the basket 200 and then firmly hand-tightening threaded members 230 to pinch the support beams 100 against the support brackets 250 of the baskets 200. The kit 1000 is now part of a lift system 4000 along with the lift 2000.

Driving the vehicle 3000 onto the baskets 200 and ensuring that both front and rear tires 3100 are centrally cradled in the upward facing concavities, or troughs, in the baskets 200, for instance as shown in FIG. 4.

Setting any emergency brake on the vehicle 3000 and then using the lift 2000 to raise the vehicle 3000 to the desired working height, for instance as shown in FIG. 5.

The above steps can be repeated in reverse to lower and remove the vehicle 3000 from the system 4000 and to remove and disassemble the kit 1000.

Further provided in various example embodiments is a method of utilizing a vehicle lift 2000, comprising the steps of: providing a two-post vehicle lift 2000 that comprises a pair of vertical transversely spaced columns 2100 each including a vertically movable lifting carriage 2200 pivotally attached with a pair of horizontally extendable and retractable lifting arms 2300 each having a vehicle support pad structure 2350 proximate a terminal end thereof; providing a kit 1000 as described herein; and assembling the kit 1000 on the two-post vehicle lift 2000 by removably positioning the pair of support beams 100 on the vehicle pad structures 2350 so that the support beams 100 are transversely spaced as shown in FIG. 3. This may comprise the steps of: removably engaging a first one of the arm connection structures 155 of a first support beam 100 with a vehicle support pad structure 2350 on a first lifting arm 2300 of a first lifting carriage 2200; removably engaging a second one of the arm connection structures 155 of the first support beam 100 with a vehicle support pad structure 2350 on a second lifting arm 2300 of the first lifting carriage 2200; removably engaging a first one of the arm connection structures 155 of a second support beam 100 with a vehicle support pad structure 2350 on a first lifting arm 2300 of a second lifting carriage 2200; and removably engaging a second one of the arm connection structures 155 of the second support beam 100 with a vehicle support pad structure 2350 on a second lifting arm 2300 of the second lifting carriage 2200. Steps may further comprise removably positioning the pair of baskets 200 on the pair of support beams 100 so that the baskets 200 are parallel and longitudinally spaced at first and second selected longitudinally-spaced mounting positions 112 on the support beams 100, comprising the steps of. This may comprise the steps of removably engaging the first hanging structure 250 of a first basket 200 with the first support beam 100 at the first selected longitudinally-spaced mounting position 112 on the first support beam 100; removably engaging the second hanging structure 250 of the first basket 200 with the second support beam 100 at the first selected longitudinally-spaced mounting position 112 on the second support beam 100; removably engaging the first hanging structure 250 of the second basket 200 with the first support beam 100 at the second selected longitudinally-spaced mounting position 112 on the first support beam 100; and removably engaging the second hanging structure 250 of the second basket 200 with the second support beam 100 at the second selected longitudinally-spaced mounting position 112 on the second support beam 100.

In various example embodiments the method may further comprise the steps of causing a vehicle 3000 to be positioned on the pair of baskets 200; and lifting the vehicle 3000 as shown in FIG. 5 by causing the two-post vehicle lift 2000 to raise the vertically movable lifting carriages 2200. In various example embodiments the method may further comprise the steps of lowering the vehicle 3000 by causing the two-post vehicle lift 2000 to lower the vertically movable lifting carriages 2200; and causing the vehicle 3000 to be positioned off of the pair of baskets 200. In various example embodiments the method may further comprise the steps of disassembling the kit 1000 and removing the kit 1000 from the two-post vehicle lift 2000, by: removing the pair of baskets 200 from the pair of support beams 100. This may comprise the steps of: removing the first hanging structure 250 of the first basket 200 from the first support beam 100; removing the second hanging structure 250 of the first basket 200 from the second support beam 100; removing the first hanging structure 250 of the second basket 200 from the first support beam 100; and removing the second hanging structure 250 of the second basket 200 from the second support beam 100. Steps may also include removing the pair of support beams 100 from the vehicle pad structures 2350, which may comprise the steps of: removing the first one of the arm connection structures 155 of the first support beam 100 from the vehicle support pad structure 2350 on the first lifting arm 2300 of the first lifting carriage 2200; removing the second one of the arm connection structures 155 of the first support beam 100 from the vehicle support pad structure 2350 on the second lifting arm 2300 of the first lifting carriage 2200; removing the first one of the arm connection structures 155 of the second support beam 100 from the vehicle support pad structure 2350 on the first lifting arm 2300 of the second lifting carriage 2200; and removing the second one of the arm connection structures 155 of the second support beam 100 from the vehicle support pad structure 2350 on the second lifting arm 2300 of the second lifting carriage 2200.

In various example embodiments where each of the arm connection structures 155 on a support beam 100 comprises an adapter 150 extending from a first end 152 configured to removably engage a hole in a vehicle support pad structure 2350 to a second end 151 configured to removably engage a hole 155 in the support beam 100 (for example but not by way of limitation, where an arm connection structure 155 on a support beam comprises an adapter 150, which may be removable therefrom), the method may further comprise the steps of: removably engaging a first one of the arm connection structures 155 of a first support beam 100 with a vehicle support pad structure 2350 on a first lifting arm 2300 of a first lifting carriage 2200 by connecting there-between a first adapter 150; removably engaging a second one of the arm connection structures 155 of the first support beam 100 with a vehicle support pad structure 2350 on a second lifting arm 2300 of the first lifting carriage 2200 by connecting there-between a second adapter 150; removably engaging a first one of the arm connection structures 155 of a second support beam 100 with a vehicle support pad structure 2350 on a first lifting arm 2300 of a second lifting carriage 2200 by connecting there-between a third adapter 150; and removably engaging a second one of the arm connection structures 155 of the second support beam 100 with a vehicle support pad structure 2350 on a second lifting arm 2300 of the second lifting carriage 2200 by connecting there-between a fourth adapter 150.

In various example embodiments the method may further comprise the steps of re-positioning the first basket 200, or the second basket 200, or both, by: disengaging the first hanging structure 250 of the basket 200 from the first support beam 100 at a first selected longitudinally-spaced mounting position 112 on the first support beam 100 and disengaging the second hanging structure 250 of the basket 200 from the second support beam 100 at a first selected longitudinally-spaced mounting position 112 on the second support beam 100; removably engaging the first hanging structure 250 of the basket 200 with the first support beam 100 at a second selected longitudinally-spaced mounting position 112 on the first support beam 100; and removably engaging the second hanging structure 250 of the basket 200 with the second support beam 100 at a second selected longitudinally-spaced mounting position 112 on the second support beam 100. In various example embodiments, the hanging structures 250 may be engaged and disengaged with the support beams 100 by hand-tightening, and hand-loosening, respectively, threaded members 230 to either pinch or release, respectively, the support beams 100 against the support brackets 250 of the baskets 200.

A method of use may also include use of the spacer plates 300 as previously described, which may be added to or removed from the baskets 200 by hand when the tires 3100 of the vehicle 3000 are not on the baskets 200. When used, the spacer plates 300 should be positioned in the baskets 200 at lateral locations corresponding to the inner and outer widths of the tires 3100 of the vehicle.

Any of the suitable technologies and materials set forth and incorporated herein may be used to implement various example aspects of the invention as would be apparent to one of skill in the art. Although exemplary embodiments and applications of the invention have been described herein including as described above and shown in the included example Figure(s), there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A kit for lifting vehicles, configured to be removably added to and used with a two-post vehicle lift that comprises;
   a first vertical column including a first vertically movable lifting carriage pivotally attached with:
      a first horizontally extendable and retractable lifting arms having a first vehicle support pad structure proximate a terminal end thereof, and
      a second horizontally extendable and retractable lifting arm having a second vehicle support pad structure proximate a terminal end thereof;
   a second vertical column transversely spaced apart from the first vertical column, the second vertical column including a second vertically movable lifting carriage pivotally attached with:
      a third horizontally extendable and retractable lifting arm having a third vehicle support pad structure proximate a terminal end thereof, and
      a fourth horizontally extendable and retractable lifting arm having a fourth vehicle support pad structure proximate a terminal end thereof:
   the kit comprising:
   first and second support beams each extending longitudinally from a front end to a back end,
      the first support beam comprising first and second arm connection structures, the first arm connection structure configured to removably engage the first vehicle support pad structure and the second arm connection structure configured to removably engage the second vehicle support pad structure;
      the second support beam comprising third and fourth arm connection structures, the third arm connection structure configured to removably engage the third vehicle support pad structure and the fourth arm connection structure configured to removably engage the fourth vehicle support pad structure; and
   a pair of baskets configured to support a vehicle, each basket having an upwardly-concave cross-section extending between first and second transversely spaced hanging structures each configured to be removably and selectably attached with and supported by one of the support beams at any of a plurality of longitudinally-spaced mounting positions on the support beam.

2. The kit of claim 1, wherein each of the arm connection structures on each support beam comprises an adapter extending from a first end configured to removably engage a hole in a vehicle support pad structure to a second end configured to removably engage a hole in the support beam.

3. The kit of claim 1 wherein the upwardly-concave cross-section of each basket further comprises inclined ramps extending from each side thereof, the inclined ramps configured to facilitate a tire of a vehicle driving into, over, and out of each basket.

4. The kit of claim 1 wherein each one of the support beams has a cross-section having at least a left side, a top side, and a right side, and each hanging structure on each basket is configured to removably engage the left side, top side, and right side of one of the support beams.

5. The kit of claim 1 wherein both support beams have top sides comprising correspondingly-spaced markings indicating various positions on which the hanging structures may be removably and selectably attached.

6. The kit of claim 1 wherein each hanging structure is configured to be removably and selectably attached with one of the support beams by a threaded member, the threaded member connected with the hanging structure and oriented to pinch said one of the support beams against the hanging structure when the threaded member is hand-tightened, and to release the hanging structure from said one of the support beams when the threaded member is hand-loosened.

7. The kit of claim 1 wherein the upwardly-concave cross-sections have a cross-sectional profile defining a concavity having a depth and width configured to cradle a tire on a vehicle, further comprising one or more spacer plates sized and shaped to fit in the upwardly-concave cross-section and reduce the depth of the concavity.

8. A system for lifting vehicles, comprising:
   the kit of claim 1 installed on the two-post vehicle lift of claim 1.

9. The system of claim 8, wherein each of the arm connection structures on each support beam is removably engaged with and supported by a respective one of the vehicle support pad structures via an adapter extending from a first end removably engaged in a hole in the vehicle support pad structure to a second end removably engaged in a hole in the support beam.

10. The system of claim 8 wherein the upwardly-concave cross-section of each basket further comprises inclined ramps extending from each side thereof, the inclined ramps configured to facilitate a tire of a vehicle driving into, over, and out of each basket.

11. The system of claim 8 wherein each one of the support beams has a cross-section having at least a left side, a top side, and a right side, and each hanging structure on each basket is removably engaged with the left side, top side, and right side of one of the support beams.

12. The system of claim 8 wherein both support beams have top sides comprising correspondingly-spaced markings indicating various positions on which the hanging structures may be removably and selectably attached.

13. The system of claim 8 wherein each hanging structure is removably and selectably attached with one of the support beams by a threaded member, the threaded member connected with the hanging structure and oriented to pinch aid one of the support beams against the hanging structure when the threaded member is hand-tightened, and to release the hanging structure from said one of the support beams when the threaded member is hand-loosened.

14. The system of claim 8 wherein the upwardly-concave cross-sections have a cross-sectional profile defining a concavity having a depth and width configured to cradle a tire on a vehicle, further comprising one or more spacer plates positioned in the basket and sized and shaped to fit in the upwardly-concave cross-section and reduce the depth of the concavity.

15. A method of utilizing a vehicle lift, comprising the steps of:
providing a kit for lifting vehicles, the kit configured to be removably added to and used with a two-post vehicle lift that comprises a pair of vertical transversely spaced columns each including a vertically movable lifting carriage pivotally attached with a pair of horizontally extendable and retractable lifting arms each having a vehicle support pad structure proximate a terminal end thereof, the kit comprising:
  a first support beam and a second support beam each extending longitudinally from a front end to a back end and each comprising at least two arm connection structures each configured to removably engage and be supported by one of the vehicle support pad structures; and
  a first basket and a second basket each configured to support a vehicle, each basket having an upwardly-concave cross-section extending between first and second transversely spaced hanging structures each configured to be removably and selectably attached with and supported by one of the support beams at any of a plurality of longitudinally-spaced mounting positions on the support beam; and
assembling the kit on the two-post vehicle lift by:
  removably positioning the first support beam and the second support beam on the vehicle pad structures so that the support beams are transversely spaced, comprising the steps of:
    removably engaging a first one of the arm connection structures of the first support beam with a first one of the vehicle support pad structures on a first one of the lifting arms of a first one of the lifting carriages;
    removably engaging a second one of the arm connection structures of the first support beam with a second one of the vehicle support pad structures on a second one of the lifting arms of the first one of the lifting carriages;
    removably engaging a first one of the arm connection structures of the second support beam with a first one of the vehicle support pad structures on a first one of the lifting arms of a second one of the lifting carriages; and
    removably engaging a second one of the arm connection structures of the second support beam with a second one of the vehicle support pad structures on a second one of the lifting arms of the second one of the lifting carriages;
  removably positioning the first basket and the second basket on the first support beam and the second support beam so that the first basket and the second basket are parallel and longitudinally spaced at first and second selected longitudinally-spaced mounting positions on the first support beam and the second support beam, comprising the steps of:
    removably engaging the first hanging structure of the first basket with the first support beam at the first selected longitudinally-spaced mounting position on the first support beam;
    removably engaging the second hanging structure of the first basket with the second support beam at the first selected longitudinally-spaced mounting position on the second support beam;
    removably engaging the first hanging structure of the second basket with the first support beam at the second selected longitudinally-spaced mounting position on the first support beam; and
    removably engaging the second hanging structure of the second basket with the second support beam at the second selected longitudinally-spaced mounting position on the second support beam.

16. The method of claim 15, further comprising the steps of:
causing a vehicle to be positioned on the first basket and the second basket; and
lifting the vehicle by causing the two-post vehicle lift to raise the vertically movable lifting carriages.

17. The method of claim 16, further comprising the steps of:
lowering the vehicle by causing the two-post vehicle lift to lower the vertically movable lifting carriages; and
causing the vehicle to be positioned off of the first basket and the second basket.

18. The method of claim 17, further comprising the steps of disassembling the kit and removing the kit from the two-post vehicle lift, by:
removing the first basket and the second basket from the first support beam and the second support beam, comprising the steps of:
  removing the first hanging structure of the first basket from the first support beam;
  removing the second hanging structure of the first basket from the second support beam;
  removing the first hanging structure of the second basket from the first support beam; and
  removing the second hanging structure of the second basket from the second support beam;
removing the first support beam and the second support beam from the vehicle pad structures, comprising the steps of:
  removing the first one of the arm connection structures of the first support beam from the vehicle support pad structure on the first lifting arm of the first lifting carriage;
  removing the second one of the arm connection structures of the first support beam from the vehicle support pad structure on the second lifting arm of the first lifting carriage;
  removing the first one of the arm connection structures of the second support beam from the vehicle support pad structure on the first lifting arm of the second lifting carriage; and
  removing the second one of the arm connection structures of the second support beam from the vehicle support pad structure on the second lifting arm of the second lifting carriage.

19. The method of claim 15, wherein each of the arm connection structures on each support beam comprises an adapter extending from a first end configured to removably engage a hole in at least one of the vehicle support pad structures to a second end configured to removably engage a hole in at least one of the support beams, further comprising the steps of:

removably engaging a first one of the arm connection structures of the first support beam with a first one of the vehicle support pad structures on a first one of the lifting arms of a first one of the lifting carriages by connecting there-between a first one of the adapters;

removably engaging a second one of the arm connection structures of the first support beam with a second one of the vehicle support pad structures on a second one of the lifting arms of the first one of the lifting carriages by connecting there-between a second one of the adapters;

removably engaging a first one of the arm connection structures of the second support beam with a first one of the vehicle support pad structures on a first one of the lifting arms of a second one of the lifting carriages by connecting there-between a third one of the adapters; and removably engaging a second one of the arm connection structures of the second support beam with a second one of the vehicle support pad structures on a second one of the lifting arms of the second one of the lifting carriages by connecting there-between a fourth one of the adapters.

20. The method of claim 15, further comprising the steps of re-positioning the second basket by:

disengaging the first hanging structure of the second basket from the first support beam at the second selected longitudinally-spaced mounting position on the first support beam and disengaging the second hanging structure of the second basket from the second support beam at the second selected longitudinally-spaced mounting position on the second support beam;

removably engaging the first hanging structure of the second basket with the first support beam at a third selected longitudinally-spaced mounting position on the first support beam; and removably engaging the second hanging structure of the second basket with the second support beam at a third selected longitudinally-spaced mounting position on the second support beam.

\* \* \* \* \*